US012595437B2

(12) United States Patent
Ghosh et al.

(10) Patent No.: US 12,595,437 B2
(45) Date of Patent: Apr. 7, 2026

(54) CATIONIC NONIONIC BLENDS FOR CLEANING OILY SOILS

(71) Applicant: ECOLAB USA INC., Saint Paul, MN (US)

(72) Inventors: Kaustav Ghosh, Saint Paul, MN (US); Olivia Neville, Saint Paul, MN (US); Lauren Michelle Hunker, Saint Paul, MN (US); Emily Chen, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 200 days.

(21) Appl. No.: 17/929,382

(22) Filed: Sep. 2, 2022

(65) Prior Publication Data

US 2023/0099021 A1 Mar. 30, 2023

Related U.S. Application Data

(60) Provisional application No. 63/260,880, filed on Sep. 3, 2021.

(51) Int. Cl.
*C11D 1/62* (2006.01)
*C11D 1/722* (2006.01)

(52) U.S. Cl.
CPC ................ *C11D 1/62* (2013.01); *C11D 1/722* (2013.01)

(58) Field of Classification Search
CPC ................................. C11D 1/62; C11D 1/722
See application file for complete search history.

(56) References Cited

U.S. PATENT DOCUMENTS

| | | | | |
|---|---|---|---|---|
| 5,863,887 | A * | 1/1999 | Gillette ................ | C11D 17/046 510/499 |
| 7,189,685 | B2 | 3/2007 | Hubig et al. | |
| 8,227,397 | B2 * | 7/2012 | Herdt ....................... | C11D 3/30 510/237 |
| 8,460,477 | B2 | 6/2013 | Hodge et al. | |
| 10,934,503 | B2 | 3/2021 | Hodge et al. | |
| 10,947,481 | B2 | 3/2021 | Blattner et al. | |

(Continued)

FOREIGN PATENT DOCUMENTS

| | | | |
|---|---|---|---|
| AU | 2020233778 | A1 | 10/2020 |
| BR | 112019003035 | A2 | 5/2019 |

(Continued)

OTHER PUBLICATIONS

Jadidi et al., "Synergism and Performance Optimization in Liquid Detergents Containing Binary Mixtures of Anionic-Cationic Surfactants", J. Surfact. Deterg., vol. 16, pp. 115-121, 2013.

(Continued)

*Primary Examiner* — Mark Eashoo
*Assistant Examiner* — M. Reza-Asdjodi
(74) *Attorney, Agent, or Firm* — McKee, Voorhees & Sease, PLC

(57) ABSTRACT

Laundry detergent compositions that are neutral detergent containing a cationic amine surfactant in combination with nonionic surfactants are disclosed. The compositions beneficially remove difficult to treat soils, including food and industrial oils on polyester, cotton and polycotton blends, as part of a two-part cleaning wash process with an alkali step. Methods of using the neutral laundry detergent compositions are also disclosed.

17 Claims, 12 Drawing Sheets

(56) References Cited

U.S. PATENT DOCUMENTS

| | | | | |
|---|---|---|---|---|
| 11,849,725 | B2 * | 12/2023 | Silvernail | A01N 25/02 |
| 2005/0065215 | A1 | 3/2005 | Biering et al. | |
| 2005/0153859 | A1 * | 7/2005 | Gohl | C11D 17/0039 510/302 |
| 2006/0128593 | A1 | 6/2006 | Smith et al. | |
| 2008/0214420 | A1 | 9/2008 | Manabe et al. | |
| 2008/0312118 | A1 | 12/2008 | Futterer et al. | |
| 2009/0196897 | A1 | 8/2009 | Gladfelter et al. | |
| 2010/0056420 | A1 | 3/2010 | Corona, III et al. | |
| 2011/0287994 | A1 * | 11/2011 | Herdt | C11D 1/62 510/214 |
| 2012/0030882 | A1 | 2/2012 | Wetrosky et al. | |
| 2013/0237470 | A1 * | 9/2013 | Bockmuehl | C11D 1/835 510/319 |
| 2015/0320797 | A1 * | 11/2015 | Cooksey | C11D 3/3947 422/37 |
| 2017/0121650 | A1 * | 5/2017 | Lundberg | C11D 3/08 |
| 2017/0347644 | A1 * | 12/2017 | Silvernail | A01N 33/12 |
| 2018/0119058 | A1 * | 5/2018 | Miracle | C09B 11/12 |
| 2018/0208875 | A1 * | 7/2018 | Man | C11D 1/65 |
| 2019/0136155 | A1 | 5/2019 | Stokes et al. | |
| 2020/0002644 | A1 * | 1/2020 | Ghosh | C11D 17/0047 |
| 2021/0032574 | A1 * | 2/2021 | Konya | C11D 17/041 |
| 2021/0189291 | A1 | 6/2021 | Walters et al. | |
| 2021/0292679 | A1 | 9/2021 | Anderson et al. | |
| 2022/0064571 | A1 * | 3/2022 | Brewer | C11D 3/38618 |
| 2022/0195338 | A1 * | 6/2022 | McGrane | C11D 3/373 |
| 2022/0195341 | A1 * | 6/2022 | McGrane | C11D 1/94 |
| 2023/0099021 | A1 * | 3/2023 | Ghosh | C11D 1/835 510/299 |

FOREIGN PATENT DOCUMENTS

| | | | |
|---|---|---|---|
| CA | 2175456 | C | 5/2005 |
| CA | 2295015 | C | 12/2009 |
| CA | 2956850 | C | 7/2021 |
| CN | 103865672 | A | 6/2014 |
| CN | 107267302 | B | 3/2020 |
| CN | 112941527 | A | 6/2021 |
| CZ | 19994633 | A3 | 2/2001 |
| DE | 19639602 | A1 | 4/1998 |
| EP | 0234082 | B1 | 9/1987 |
| EP | 3015538 | A1 | 5/2016 |
| EP | 3528632 | A1 | 8/2019 |
| EP | 3590336 | A1 | 1/2020 |
| WO | 0148136 | A1 | 7/2001 |
| WO | 2004094305 | A2 | 11/2004 |
| WO | 2013061082 | A1 | 5/2013 |
| WO | 2013098547 | A1 | 7/2013 |
| WO | 2021129930 | A1 | 7/2021 |

OTHER PUBLICATIONS

Meyer et al., “Counterion association in mixed micelles of cationic and nonionic detergents”, Journal of Colloid and Interface Science, vol. 99, Issue 2, pp. 536-542, abstract provided, Jun. 1984.

Air Products, “Tomamine Q-C 15 Surfactant”, Safety Data Sheet, 9 pages, printed May 17, 2015.

Xue et al., “Interfacial molecular array behaviors of mixed surfactant systems based on sodium laurylglutamate and the effect on the foam properties”, Journal of Dispersion Science and Technology, vol. 39, No. 10, pp. 1427-1434, 2018.

International Search Report and Written Opinion in PCT/US2022/075881, mailed Nov. 16, 2022, 17 pages.

Jacaab-Ethoquad C/12, Material Safety Data Sheet, Jacaab LLC, Jun. 20, 2005 [retrieved on Nov. 8, 2022]. Retrieved from the Internet: <URL:http://76.12.170.236/msds/Ethoquad%20C12%20MSDS.pdf>, 8 pages.

* cited by examiner

FIG. 3
% Soil Removal of Industrial Soils
% Soil Removal
60
50
40
30
20
Condition
Control A
Control A + Lonzabac
Control B
Control B + Lonzabac
Control C
Control C + Lonzabac
Substrate
cotton
polycotton
polyester

CATIONIC NONIONIC BLENDS FOR CLEANING OILY SOILS

CROSS-REFERENCE TO RELATED APPLICATIONS

This application claims priority under 35 U.S.C. § 119 to provisional application Ser. No. 63/260,880, filed Sep. 3, 2021, herein incorporated by reference in its entirety.

FIELD OF THE INVENTION

This disclosure relates to laundry detergent compositions which function as a neutral detergent containing a cationic amine surfactant in combination with nonionic surfactants to beneficially remove difficult to treat soils, including for example food and industrial oils on various textile substrates including polyester, cotton and polycotton blends. Methods of using the laundry detergent compositions are also provided as part of a two-part cleaning wash process with an alkali step.

BACKGROUND OF THE INVENTION

In laundry processes, particularly commercial laundry processes with high amounts of soil, textiles are commonly laundered at elevated temperatures with highly alkaline detergent materials. Such detergent materials typically contain a source of alkalinity such as an alkali metal hydroxide, alkali metal silicate, alkali metal carbonate or other similar alkaline component. Such processes can cause residual or carryover alkalinity that require acidic souring steps to remove or mitigate the carryover alkalinity. Sour materials contain acid components that neutralize alkaline residues on the fabric.

Despite numerous advances in laundry detergent compositions and methods of using them, there remain ongoing needs in the laundering field for enhanced removal of difficult to treat soils, namely food and beverage oils (e.g. oily soil and/or oily stains) from various types of textiles. Textiles contain a variety of different fibers, including natural, manmade, and/or synthetic fibers. Natural fibers are generally derived from plants or animals. For example, protein-based natural fibers include wool and silk, while cellulosic fibers include cotton and linen. Manmade fibers such as rayon and acetate are generally manufactured from regenerated cellulose. Synthetic fibers include, for example, nylon, olefin, polyester, acrylic, and corterra. Cotton in particular is one of the most popular fibers used in textiles. Cotton can be combined or blended with other fibers to create blends that dry easily, demonstrate excellent elasticity, and feel soft. Cotton-containing textiles also demonstrate high absorbency, which is a desirable property for use but also means cotton stains easily. Additionally, cotton has poor resilience and poor abrasion resistance. The poor resiliency and abrasion resistance combined with harsher cleaning products typically required to remove soil from cotton-containing textiles result in a short lifespan and high replacement rate. Synthetic fibers are generally hydrophobic and oleophilic. As such the oleophilic characteristics of the fiber permit oil and grime to be readily embedded in the fiber, and the hydrophobic properties of the fiber prevent water from entering the fiber to remove the contaminants from the fiber.

These challenges are often exacerbated in the presence of stubborn soils such as oily soils found on textiles from food, beverage and industrial applications, such as mops including bar mops, napery, food service coats, industrial garments, shop towels, and the like. As a result, costs in various food, beverage and industrial applications using textiles often include textile replacement costs as a result of stains, namely oily stains, that simply cannot be fully removed from the fabric. Thus, despite various existing laundry detergent compositions there remains a long-standing need to improve stain removal and thereby reduce replacement rate of fabrics, allowing the textiles to remain in use for a longer time.

Accordingly, there is a need to provide laundry detergent compositions which provide effective soil removal, including for example food, beverage and industrial soils that are conventionally difficult to remove and result in high replacement costs for textiles.

A further object of the disclosure is to provide cleaning methods and compositions that are effective at removing soils at low temperature and low alkali conditions.

Other objects, aspects and advantages of this invention will be apparent to one skilled in the art in view of the following disclosure, the drawings, and the appended claims.

SUMMARY OF THE INVENTION

An advantage of the compositions and methods disclosed herein is that they are effective at removing difficult to treat soils, including food and industrial oils, from various textiles, including at low temperature and low alkali conditions. It is an advantage that the compositions and methods contribute to stubborn soil removal, even oily soils, through the combined use of cationic and nonionic surfactants in a neutral detergent that is combined with or followed by an alkali detergent.

In some embodiments, laundry detergent compositions comprise: a cationic amine surfactant having one of the following general structures:

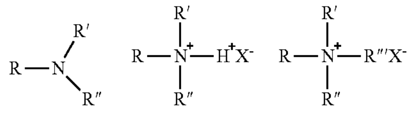

wherein R is an alkyl chain, R', R", and R'" may be either alkyl chains, aryl groups or hydrogen and X is an anion; and at least one nonionic surfactant; and water, wherein a pH of the laundry detergent use composition in a washing machine is between about 6 to about 9.

In some embodiments, the cationic amine surfactant is a multi-branched cationic amine, an ethoxylated amine, polyamine, or a quaternary ammonium compound. In an embodiment, the cationic amine surfactant is selected from the group consisting of N-(3-aminopropyl)-N-dodecylpropane-1,3-diamine, N-(3-aminopropyl)-N-dodecylpropane-1,3-diamine, N, N-Bis (3-aminopropyl) dodecylamine, N1,N1,N3-tris(3-aminopropyl)-N3-dodecylpropane-1,3-diamine, N1,N1-bis(3-aminopropyl)-N3-dodecylpropane-1,3-diamine, N1-(3-aminopropyl)-N3-dodecylpropane-1,3-diamine, N-dodecylpropane-1,3-diamine, N,N-bis(3-aminopropyl)-octylamine, N,N-bis(3-aminopropyl)-dodecylamine, 4-aminomethyl-1,8-octanediamine, 1,3,5-tris-(aminomethyl)-benzene, 1,3,5-tris-(aminomethyl)-cyclohexane, tris-(2-aminoethyl)-amine, tris-(2-aminopropyl)-amine, tris-(3 aminopropyl)-amine, and coco alkylbis(hydroxyethyl)methyl, ethoxylated, ammonium chloride. In an embodiment, the cationic amine is N-(3-aminopropyl)-N-dodecylpropan-1,3-diamine or a coco alkylbis(hydroxyethyl)methyl, ethoxylated, ammonium chloride. In an embodiment, the cationic amine surfactant comprises between about 0.5 wt-% to about 20 wt-%, or between about 1 wt-% to about 10 wt-%, or between about 5 wt-% to about 10 wt-% of the composition.

In some embodiments, the nonionic surfactants are a fatty alcohol alkoxylate, alcohol alkoxylate, EO/PO block copolymers, ethoxylated castor oil, alkyl polyglucosides, or combinations thereof. In an embodiment, the nonionic surfactant is a fatty alcohol ethoxylate, alcohol ethoxylate, EO/PO block copolymers or combination thereof. In an embodiment, the nonionic surfactants comprise between about 20 wt-% to about 90 wt-%, or between about 50 wt-% to about 80 wt-%, or between about 55 wt-% to about 80 wt-% of the composition.

In some embodiments, the water or carrier comprises between about 0.1 wt-% to about 50 wt-%, or between about 0.1 wt-% to about 40 wt-%, or between about 1 wt-% to about 30 wt-% of the composition.

In some embodiments, the composition comprises at least one additional functional ingredient selected from the group consisting of optical brighteners, soil release polymers, solubility modifiers, dispersants, stabilizing agents, water conditioning agents, enzymes, builders/sequestrants/chelating agents, rheology and/or solubility modifiers, hydrotropes or couplers, and solvents. In an embodiment, the additional functional ingredient(s) comprise between about 0.1 wt-% to about 20 wt-%, or between about 1 wt-% to about 20 wt-%, or between about 1 wt-% to about 10 wt-% of the composition.

In some embodiments, the cationic amine surfactant comprises from about 1% to about 15% on an actives basis of the total surfactant concentration of the composition, from about 5% to about 15% on an actives basis of the total surfactant concentration of the composition, from about 8% to about 12% on an actives basis of the total surfactant concentration of the composition, or about 10% on an actives basis of the total surfactant concentration of the composition.

In some embodiments, the pH of the laundry detergent use composition is between about 7 to about 9, between about 7 to about 8, or about 7.

In some embodiments, the composition is a solid or liquid.

In some embodiments, the composition is diluted with water at a ratio of from about 1:10 to about 1:10,000 (composition to water).

In some embodiments, methods of washing textiles comprise: contacting textiles with the laundry detergent composition according to any one of the embodiments described herein and an alkali step. In some embodiments, methods of washing textiles comprise: contacting textiles with a 2-step cleaning wash process comprising first contacting the textiles with the laundry detergent composition according to any one of the embodiments described herein at a pH between about 6 to about 9 in a use solution during a wash cycle, and thereafter contacting the textiles with an alkali step to increase the pH of the use solution; and washing the textiles in an institutional or a household washing machine to remove soils.

In some embodiments, the method further comprises diluting the laundry detergent composition at a point of use with water to form an aqueous use solution of the composition. In an embodiment, the aqueous use solution of the composition has a pH between about 7 and about 9. In some embodiments, the contacting of the textiles with the alkali step increases the pH above 9. In some embodiments, the alkali step comprises a source of alkalinity or an alkaline detergent composition.

In some embodiments, the method comprises a second application of the laundry detergent composition according to any of the embodiments described herein at a pH between about 6 to about 9 during a wash cycle follows the alkali step.

In some embodiments of the method, the soils are industrial oils. In some embodiments of the method, the textile comprises at least one of polyester, cotton or polycotton blends. In some embodiments of the method, the textile is one or more of a mop, napery, food service coat, industrial garment, or towels.

In some embodiments of the method, the wash cycle has a wash temperature about ≤150° F. In some embodiments of the method, the wash cycle provides about ≤500 ppm alkalinity for a low alkalinity laundry program. In some embodiments of the method, the wash cycle further comprises a rinsing phase and draining phase. In some embodiments of the method, the wash cycle further comprises a bleaching step, antichlor step and/or souring step.

In some embodiments, the method the method increases the amount of oil removal from the textile in comparison to a wash cycle that does not include the cationic amine surfactant. In some embodiments of the method, the removal of soils is a reduction in visible residual oils on the textile, enhanced whiteness of the textile and/or reduction of soils with hygienically clean confirmation.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

Figure 1:
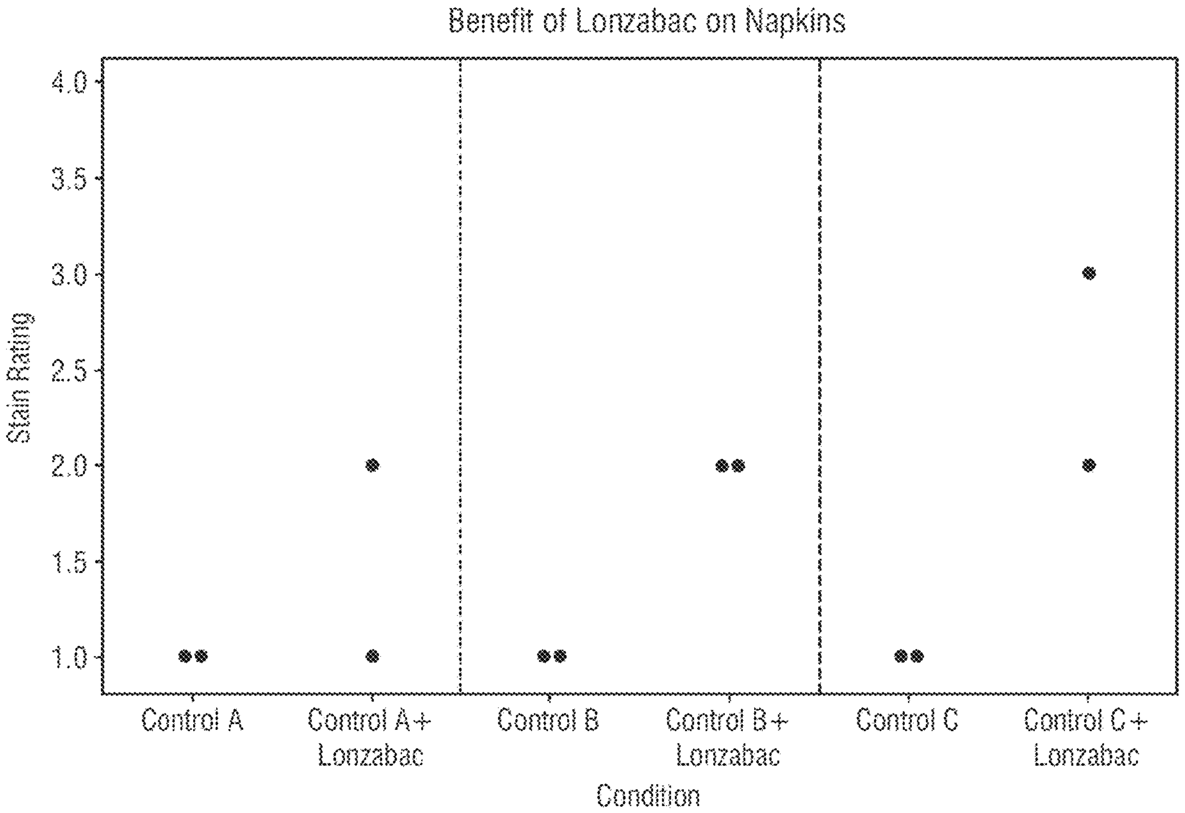
FIG. 1 shows the efficacy of adding a cationic amine surfactant to a laundry detergent for improvement in soil rating on napkins soiled with oily stains as evaluated in Example 1.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

As used herein, the term "and/or", e.g., "X and/or Y" shall be understood to mean either "X and Y" or "X or Y" and shall be taken to provide explicit support for both meanings or for either meaning, e.g. A and/or B includes the options i) A, ii) B or iii) A and B.

It is to be appreciated that certain features that are, for clarity, described herein in the context of separate embodiments, may also be provided in combination in a single embodiment. Conversely, various features that are, for brevity, described in the context of a single embodiment, may also be provided separately or in any sub-combination.

So that the present invention may be more readily understood, certain terms are first defined. Unless defined otherwise, all technical and scientific terms used herein have the same meaning as commonly understood by one of ordinary skill in the art to which embodiments of the invention pertain. The definitions are provided to aid in describing particular embodiments, and are not intended to limit the claimed invention, because the scope of the invention is limited only by the claims. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein "cationic surfactants" include and refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom. Cationic surfactant compounds classified as amine oxides, amphoterics and zwitterions are themselves typically cationic in near neutral to acidic pH solutions and can overlap surfactant classifications. Polyethoxylated cationic surfactants generally behave like nonionic surfactants in solutions with a pH above the cationic surfactant's pKa and like cationic surfactants in solutions with a pH below the surfactant's pKa.

As used herein, the term "cleaning" refers to a method used to facilitate or aid in, or a composition used in, soil removal, including in a laundering process. The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like.

The term "commercially acceptable cleaning performance" refers generally to the degree of cleanliness, extent of effort, or both that a typical consumer would expect to achieve or expend when using a cleaning product or cleaning system to address a typical soiling condition on a typical substrate. This degree of cleanliness may, depending on the particular cleaning product and particular substrate, correspond to a general absence of visible soils, or to some lesser degree of cleanliness. Cleanliness may be evaluated in a variety of ways depending on the particular cleaning product being used (e.g., textile detergent) and the particular hard or soft surface being cleaned (e.g., textile, fabric, and the like), and normally may be determined using generally agreed industry standard tests or localized variations of such tests. In the absence of such agreed industry standard tests, cleanliness may be evaluated using the tests as set forth in the description of the present disclosure or a test or tests already employed by a manufacturer or seller to evaluate the cleaning performance of its products.

As used herein, the term "free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of laundry items including bed sheets, pillowcases, towels, table linen, tablecloth, bar mops and uniforms. The application additionally provides a composition and method for treating non-laundry articles and surfaces including hard surfaces such as dishes, glasses, and other ware.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

"Soil" or "stain" refers to a non-polar oily substance which may or may not contain particulate matter such as mineral clays, sand, natural mineral matter, carbon black, graphite, kaolin, environmental dust, colorant, dyes, polymers, and oils. The terms "soil" and "stain" include, but are not limited to, cosmetic stains.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "surfactant" refers to a compound that contains a lipophilic segment and a hydrophilic segment, which when added to water or solvents, reduces the surface tension of the system.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Laundry Detergent Compositions

According to embodiments, the laundry detergent compositions include cationic amine surfactant in nonionic detergent compositions to provide a neutral laundry detergent composition. The laundry detergent compositions can include a cationic amine surfactant in combination with at least two nonionic surfactants. Additionally, additional functional ingredients and can be provided in the neutral laundry detergent compositions. The compositions can be liquids or solids (wherein a solid stable carrier is employed in place of water) and are referred to as concentrate compositions. Exemplary laundry detergent compositions are shown in Table 1 in weight percentage. While some components may have a percent actives of 100%, it is noted in the Tables throughout the application do not recite the percent actives of the components, but rather, recites the total weight percentage of the raw materials (i.e. active concentration plus inert ingredients).

TABLE 1

| Material | First Exemplary Range wt.-% | Second Exemplary Range wt.-% | Third Exemplary Range wt.-% |
|---|---|---|---|
| Cationic amine surfactant(s) | 0.5-20 | 0.5-10 | 1-10 |
| Nonionic surfactant(s) | 20-90 | 30-80 | 50-80 |
| Water and/or Carrier | 0.1-50 | 0.1-40 | 1-30 |
| Additional Functional Ingredients | 0-20 | 1-20 | 1-10 |

The laundry detergent compositions may be provided as a solid. This beneficially avoids the expense associated with shipping and storing a composition containing a large amount of water. The laundry detergent compositions may also be provided as a liquid concentrate. The concentrate is then normally diluted at the location of use to provide a use solution. Furthermore, it is also possible that the concentrate is first diluted to provide a more dilute concentrate and then a ready-to-use composition is prepared by further diluting the diluted concentrate. In general, a concentrate refers to a composition that is intended to be diluted with water to provide a use solution that contacts an object to provide the desired cleaning. The laundry detergent composition that contacts the articles to be washed can be referred to as a concentrate or a use composition (or use solution) dependent upon the formulation employed in methods. It should be understood that the concentration of the cationic amine surfactant and nonionic surfactants in the composition (and other components) will vary depending on whether the composition is provided as a concentrate or as a use solution.

A use solution may be prepared from the concentrate by diluting the concentrate with water at a dilution ratio that provides a use solution having desired detersive properties. The water that is used to dilute the concentrate to form the use composition can be referred to as water of dilution or a diluent and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water, inclusive of all integers with this range, e.g., 1:50, 1:100, 1:1,000, and the like. Particularly, the concentrate is diluted at a ratio of between about 1:100 and about 1:5,000 concentrate to water.

Beneficially the pH of the detergent compositions in use solution (i.e. when added to water in the laundry application) is maintained in the neutral range in order to provide sufficient detergency properties that benefit from the inclusion of the cationic amine surfactant. In an embodiment, the pH of the detergent compositions in use solution is maintained below the pKa of the cationic amine surfactant. Without being limited to a particular mechanism of action, there is a benefit to a neutral scrub step as part of the wash cycle with the laundry detergent composition containing the cationic amine surfactant, as the cationic amine surfactant is positively charged (e.g. Lonzabac pKa of 9.5) and is then strongly attracted to the textile substrate. As referred to herein the neutral laundry detergent composition does not significantly change the pH of water it is added to in order to form a use solution of the laundry detergent. As one skilled in the art will recognize the pH of water used in the applications of use can vary, such as between about 6 and about 9. In a preferred embodiment, the pH of the use solution of the laundry detergent composition is between about 6 and about 9. Particularly, the pH of the use solution is between about 7 and about 9. More particularly, the pH of the use solution is between about 7 and about 8. In a particularly preferred embodiment, the pH of the use solution is about 7.

Cationic Amine Surfactants

The laundry detergent compositions include at least one cationic amine surfactant. The cationic amine surfactants for use in the laundry detergent compositions include non-quaternary amines, amine salts, and quaternary ammonium compounds having the following general structure:

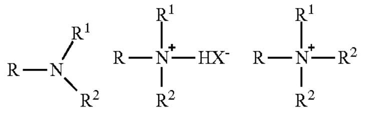

in which, R represents an alkyl chain, R', R", and R''' may be either long alkyl chains or smaller alkyl or aryl groups or hydrogen and X represents an anion. In various embodiments amine salts and quaternary ammonium compounds are preferred due to their high degree of water solubility. Long alkyl chains refer to those with a carbon chain length of C8 or greater. Smaller groups include short chain lengths ranging from C1 to C7.

Cationic surfactants can include those having the formula $R^1_m R^2_x Y_L Z$ wherein each $R^1$ is an organic group containing a straight or branched alkyl or alkenyl group optionally substituted with up to three phenyl or hydroxy groups and optionally interrupted by up to four of the following structures:

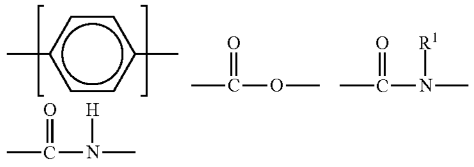

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y can be a group including, but not limited to:

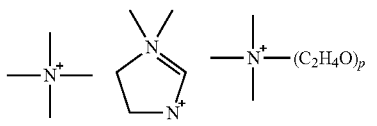

-continued p = about 1 to 12

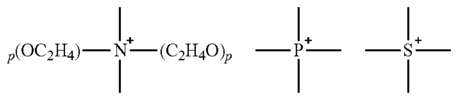

p = about 1 to 12

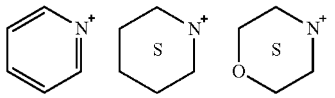

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water-soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Preferred cationic amine surfactants include but are not limited to N-(3-aminopropyl)-N-dodecylpropane-1,3-diamine, N-(3-aminopropyl)-N-dodecylpropane-1,3-diamine, N, N-Bis (3-aminopropyl) dodecylamine, N1,N1,N3-tris(3-aminopropyl)-N3-dodecylpropane-1,3-diamine, N1,N1-bis (3-aminopropyl)-N3-dodecylpropane-1,3-diamine, N1-(3-aminopropyl)-N3-dodecylpropane-1,3-diamine, N-dodecylpropane-1,3-diamine, among others. Such exemplary cationic amine compounds are available by the trade names Lonzabac 12.100, Lonzabac 12.30, Cotilps 739, Tomamine DA-17, Tomamine DA-14, Tomamine DA-1618, Tomamine DA-1214, and the like.

More particularly, suitable triamines include N,N-bis(3-aminopropyl)-octylamine, N,N-bis(3-aminopropyl)-dodecylamine, 4-aminomethyl-1,8-octanediamine, 1,3,5-tris-(aminomethyl)-benzene, 1,3,5-tris-(aminomethyl)-cyclohexane, tris-(2-aminoethyl)-amine, tris-(2-aminopropyl)-amine, tris-(3 aminopropyl)-amine, or a combination thereof.

Exemplary polyamines include polyethyleneimine (PEI) polymers or derivatives thereof or salts thereof, which also includes ethoxylated PEI polymers. Polyethyleneimines may include primary, secondary or tertiary amine compounds. The polyethyleneimine compounds and/or its derivatives may include linear and/or branched polyethyleneimines. Still further, polyethyleneimines and/or its derivatives can vary significantly in molecular weight, topology and shape, including for example linear, branched or comb-like structures as a result of ring-opening polymerization of the ethylenimine. See Angelescu et al., *Langmuir,* 27, 9961-9971 (2011), which is incorporated herein by reference in its entirety. According to an aspect of the invention, the bleach activator may be a linear and/or branched polyethyleneimine. PEIs can have molecular weight ranges from about 800 Daltons to about 2 million Daltons, more preferably from about 800 Daltons to about 1 million Daltons, or more preferably from about 800 Daltons to about 500 kDa. In some embodiments the charge density of the PEIs is from about 15 mEq/g to about 25 mEq/g. Various commercial polyethyleneimines are available, including for example those sold under the tradename Lupasol® (BASF), including for example Lupasol® FG, Lupasol® G, Lupasol® PR 8515, Lupasol® WF, Lupasol® G 20/35/100, Lupasol® HF, Lupasol® P, Lupasol® PS, Lupasol® PO 100, Lupasol® PN 50/60, and Lupasol® SK.

Such exemplary polyethyleneimines are available as anhydrous polyethyleneimines and/or modified polyethyleneimines provided in aqueous solutions or methoyxypropanol (Lupasol® PO 100). The molar mass of the polyethyleneimines, including modified polyethyleneimines can vary from about 800 g/mol to at least 2,000,000 g/mol.

Exemplary ether diamines include, but are not limited to hexyloxypropyl amine, 2-Ethylhexyloxypropyl amine, octyl/decyloxypropyl amine, isodecyloxypropyl amine, dodecyl/tetradecyloxypropyl amine, isotridecyloxypropyl amine, tetradecyl/dodecyloxypropyl amine, linear alkyloxypropyl amines, or a combination thereof. Exemplary aliphatic diamines include but are not limited to bis(2-aminoethyl) ether, 3,6-dioxoctane-1,8-diamine, 4,7-dioxadecane-1,10-diamine, 4,7-dioxadecane-2, 9-diamine, 4,9-dioxadodecane-1,12-diamine, 5,8-dioxadodecane-3,10-diamine, 4,7,10-trioxatridecane-1,13-diamine and higher oligomers of these diamines, bis-(3-aminopropyl) polytetrahydrofurans and other polytetrahydrofuran-diamines, as well as polyoxyalkylene-diamines. Suitable ether diamines include, but are not limited to isotridecyloxypropyl-1,3-diaminopropane, octyl/decyloxypropyl-1,3-diaminopropane, isodecyloxypropyl-1,3-diaminopropane, dodecyl/tetradecyloxypropyl-1, 3-diaminopropane, or a combination thereof.

Suitable ethoxylated amines include but are not limited to bis-(2-hydroxyethyl) isodecyloxypropylamine, poly (5) oxyethylene isodecyloxypropylamine, bis-(2-hydroxyethyl) isotridecyloxypropylamine, poly (5) oxyethylene isotridecyloxypropylamine, bis-(2-hydroxyethyl) tallow amine (including 5 and 15-mole adducts), N-tallow-poly (3) oxyethylene-1,3-diaminopropane, or a combination thereof.

Exemplary cationic multi-branched amine surfactants include, but are not limited to: N, N-Bis (3-aminopropyl) dodecylamine; N1,N1,N3-tris(3-aminopropyl)-N3-dodecylpropane-1,3-diamine; N1,N1-bis(3-aminopropyl)-N3-dodecylpropane-1,3-diamine; N1-(3-aminopropyl)-N3-dodecylpropane-1,3-diamine; N-dodecylpropane-1,3-diamine; isotridecyloxypropyl-1,3-diaminopropane; dimethyltetradecylamine oxide, lauramine oxide, or a mixture thereof.

Exemplary quaternary ammonium compounds. Exemplary quaternary ammonium compounds include alkylated quaternary ammonium compounds, ring or cyclic quaternary ammonium compounds, aromatic quaternary ammonium compounds, diquaternary ammonium compounds, alkoxylated quaternary ammonium compounds, amidoamine quaternary ammonium compounds, ester quaternary ammonium compounds, and mixtures thereof.

The compositions described herein include at least one quaternary ammonium compound. Quaternary ammonium compounds have the following general formula:

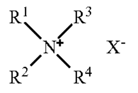

wherein $R^1$, $R^2$, $R^3$, and $R^4$ can each be C1-C24 aliphatic, normal or branched saturated or unsaturated hydrocarbon groups, alkoxy groups (R—O—), polyalkoxy groups, benzyl groups, allyl groups, hydroxyalkyl groups (HOR—), and the like, and X is an anion, selected from halide, methyl sulphate or ethyl sulphate radicals. The quaternary ammonium compounds can include any anion or counter ion that allows the component to be used in a manner that imparts fabric-softening properties. Exemplary counter ions include chloride, methyl sulfate, ethyl sulfate, and sulfate.

Exemplary quaternary ammonium compounds have the following general formula:

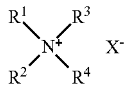

wherein $R^1$ and $R^2$ represent the same or different hydrocarbyl groups having from about 12 to about 24 carbon atoms, from about 12 to about 22 carbon atoms, more from about 14 to about 22 carbon atoms, or still more from about 14 to about 20 carbon atoms; $R^3$ and $R^4$ represent the same or different hydrocarbyl groups containing about 1 to about 4 carbon atoms; and X is any suitable anion, such as a halide.

Preferred quaternary ammonium compounds have highly saturated carbon backbones (i.e., high degree of saturation of alkyl groups) of the hydrocarbyl groups. the quaternary ammonium compounds has two long R alkyl or alkenyl based chains (i.e., $R^1$ and $R^2$) As referred to herein, "highly saturated" or a "high degree of saturation" with reference to the carbon backbones are represented by a low iodine value of the quaternary ammonium compounds, namely an iodine value equal to 15 or less.

Representative examples of these quaternary ammonium compounds include, for example, di(tallow alkyl)dimethyl ammonium methyl sulphate; dihexadecyl dimethyl ammonium chloride; di(hydrogenated tallow alkyl)dimethyl ammonium chloride; dioctadecyl dimethyl ammonium chloride; di(hydrogenated tallow alkyl)dimethyl ammonium methyl sulphate; dihexadecyl diethyl ammonium chloride; di(coconut alkyl)dimethyl ammonium chloride; coco alkyl-bis(hydroxyethyl)methyl, ethoxylated, ammonium chloride, ditallow alkyl dimethyl ammonium chloride; and di(hydrogenated tallow alkyl)dimethyl ammonium chloride, and combinations thereof.

Further representative examples of quaternary ammonium compounds include but are not limited to mono-C8-C24 alkyl trimethyl quaternary ammonium compounds, monomethyl tri-C8-24 alkyl quaternary ammonium compounds, imidazolinium quaternary ammonium compounds, dimethyl-C8-24 alkylbenzyl quaternary ammonium compounds, complex di quaternary ammonium compounds, di-C8-24 alkyl dimethyl quaternary ammonium compounds, mono or dialkyl di or trialkoxy quaternary ammonium compounds, mono or dialkyl di or tripolyalkoxy quaternary ammonium compounds, (the alkoxy group being a methoxy, ethoxy or propoxy group or a hydroxyethyl or hydroxypropyl; the polyalkoxy being polyethoxy or polypropoxy group with 2-50 alkoxy groups), diamidoamine-methyl-C8-C22 alkyl-quaternary ammonium compounds, and di-C8-C22 alkyl methyl benzyl quaternary ammonium compounds.

The compositions can include a quaternary ammonium compound having sufficient saturated hydrocarbon groups, such as the alkyl groups, to have an iodine value equal to 15 or less. In a further embodiment, the compositions can include a dialkyl quaternary ammonium compound having saturated alkyl groups for $R^1$ and $R^2$ having from about 8 to about 24 carbon atoms, from about 12 to about 24 carbon atoms, from about 12 to about 22 carbon atoms, more from about 14 to about 22 carbon atoms, or still more from about 14 to about 20 carbon atoms. An exemplary dialkyl quaternary ammonium compound is a di(hydrogenated tallowalkyl)dimethyl ammonium chloride (DHTDMAC), DEEDMA(C) quat, or an ester quat, such as a di(hydrogenated) tallow dimethyl ammonium methyl sulfate (DHTDMAMS) esterquat.

Representative examples of quaternary ammonium compounds include, for example, alkyl benzyl ammonium chloride or alkyl dimethyl benzyl ammonium chloride (ADBAC), such as alkyl C12-C18 benzyl ammonium chloride, alkyl ethylbenzyl ammonium chloride or alkyl dimethyl ethylbenzyl ammonium chloride (ADEBAC), such as alkyl C12-C18 ethylbenzyl ammonium chloride, dialkyl ammonium salt or dialkyl dimethyl ammonium chloride, such as di alkyl C12-C18 di alkyl C1-C4 ammonium salt.

The compositions can include an amidoamine quaternary ammonium compound, including for example diamidoamine quaternary ammonium compounds. Exemplary diamidoamine ethoxylate quaternary ammonium compounds are available under the name Varisoft®, including ditallow diamidoamine ethoxylated ammonium methylsulfate, dimethyl dihydrogenated tallow ammonium chloride, dimethyl di($C_{14}$-$C_{18}$ alkyl) ammonium chloride, dicoco dimethyl ammonium chloride, methyl tri-$C_8$-$C_{10}$ ammonium chloride, tallow trimethyl ammonium chloride, tallow diamine pentamethyl dichloride, or a combination thereof.

Exemplary amidoamine quaternary ammonium compounds include methyl-bis(tallow amidoethyl)-2-hydroxyethyl ammonium methyl sulfate, methyl bis(oleylamidoethyl)-2-hydroxyethyl ammonium methyl sulfate, and methyl bis(hydr. Tallow amidoethyl)-2-hydroxyethyl ammonium methyl sulfate, commercially available as Accosoft® 501.

The compositions can include an imidazolinium quaternary compound. Exemplary imidazolinium quaternary ammonium compounds include methyl-1hydr. tallow amido ethyl-2-hydr. tallow imidazolinium-methyl sulfate, methyl-1-tallow amido ethyl-2-tallow imidazolinium-methyl sulfate, methyl-1-oleyl amido ethyl-2-oleyl imidazolinium-methyl sulfate, and 1-ethylene bis(2-tallow, 1-methyl, imidazolinium-methyl sulfate).

The compositions can include an alkylated quaternary compound. Exemplary alkylated quaternary ammonium compounds include ammonium compounds having an alkyl group containing between 6 and 24 carbon atoms. Exemplary alkylated quaternary ammonium compounds include monoalkyl trimethyl quaternary ammonium compounds, monomethyl trialkyl quaternary ammonium compounds, and dialkyl dimethyl quaternary ammonium compounds.

The compositions can include an ester quaternary compound. Ester quats refer to a compound having at least two or more alkyl or alkenyl groups connected to the molecule via at least one ester link. An ester quaternary ammonium compound can have at least one or can have two or more ester links present. Exemplary ester quaternary ammonium compounds include for example, di-alkenyl esters of triethanol ammonium methyl sulphate and N,N-di(tallowoyloxy ethyl)N,N-dimethyl ammonium chloride, polyol ester quat (PEQ). Commercial examples of compounds include, but are not limited to, di-oleic ester of triethanol ammonium methyl sulphate, di-oleic ester of triethanol ammonium methyl sulphate, partially hardened tallow ester of triethanol ammonium ethyl sulphate, palm ester of triethanol ammonium methyl sulphate, hardened tallow ester of triethanol ammonium methyl sulphate, unsaturated carboxylic acid reaction products with triethanolamine dimethyl sulphate quaternized. Further examples include triethanolamine (TEA) ester quats (e.g., methyl bis(ethyl tallowate)-2-hydroxyethyl ammonium methyl sulfate), methyldiethanolamine (MDEA) ester quats, diamidoquats (e.g., methyl bis(hydrogenated tallow amidoethyl)-2-hydroxyethyl ammonium methyl sulfate), and dialkyldimethyl quats (e.g., dihydrogenated tallow dimethyl ammonium chloride). Preferred MDEA esterquats include methyl diethanolamine esterquat, commercially available as Variquat S. Preferred DHTDMAMS esterquats include, for example, the esterquat commercially available as Agent 2246. Additional preferred ester quats are those made from the reaction of alkyl carboxylic acid fraction, methyl ester and triglyceride with triethanolamine, for example triethanolamine ester quats, such as those sold under the commercial name, WE-45 HF.

In some embodiments, the cationic amine surfactant is included in the laundry detergent composition at an amount of at least about 0.5% to about 20 wt-%, 1 wt-% to about 20 wt-%, about 1 wt-% to about 15 wt-%, about 1 wt-% to about 10 wt-%, about 2 wt-% to about 10 wt-%, about 3 wt-% to about 10 wt-%, about 4 wt-% to about 10 wt-%, or about 5 wt-% to about 10 wt-%. In addition, without being limited according to the invention, all ranges recited are inclusive of the numbers defining the range and include each integer within the defined range.

The wt-% ranges of the cationic amine surfactant in the laundry detergent composition are intended to provide the cationic amine surfactant in a concentration that on an actives basis is about 10% of the total surfactant concentration of the composition. In further embodiments, the cationic amine surfactant comprises from about 1% to about 15% on an actives basis of the total surfactant concentration of the composition, from about 5% to about 15% on an actives basis of the total surfactant concentration of the composition, from about 8% to about 12% on an actives basis of the total surfactant concentration of the composition, or from about 1% to about 10% on an actives basis of the total surfactant concentration of the composition.

Nonionic Surfactants

The laundry detergent compositions include at least one nonionic surfactant. In preferred embodiments, the laundry detergent compositions include at least two nonionic surfactants.

In an aspect, the one or more nonionic surfactants include surfactants with a hydrophile-lipophile balance (HLB) of between about 1 to about 15. In an embodiment, the nonionic surfactants have an HLB of between about 6 to about 15. The HLB number is used as a measure of the ratio of hydrophilic and lipophilic grounds in a given surfactant or surfactant blend. It is a value between 0 and 60 which functionally defines the affinity of a surfactant for water or oil. Nonionic surfactants in particular typically have an HLB of between 0 and 20. Surfactants having an HLB of >10 have an affinity for water, and surfactants with an HLB of <10 have an affinity for oil.

Nonionic surfactants suitable for use with the compositions of the present application include synthetic or natural alcohols that are alkoxylated (with ethylene and/or propylene and/or butylene oxide) to yield a variety of $C_6$-$C_{24}$ alcohol ethoxylates and/or propoxylates and/or butoxylates (preferably $C_5$-$C_{14}$ alcohol ethoxylates, C9-$C_{11}$ alcohol ethoxylates, $C_{11}$-$C_{14}$ alcohol ethoxylates, $C_{12}$-$C_{16}$ alcohol ethoxylates and/or propoxylates and/or butoxylates having 1 to 20 alkylene oxide groups (preferably 2 to 20 alkylene oxide groups); $C_5$-$C_{24}$ alkylphenol ethoxylates (preferably $C_8$-$C_{10}$ alkylphenol ethoxylates) having 1 to 100 ethylene oxide groups (preferably about 12 to about 20 ethylene oxide groups); and $C_5$-$C_{24}$ alkylpolyglycosides (preferably $C_5$-$C_{20}$ alkylpolyglycosides) having 1 to 20 glycoside groups (preferably 9 to 20 glycoside groups).

Suitable alkoxylated surfactants for use as surfactants include EO/PO block copolymers, such as the Pluronic® and reverse Pluronic® surfactants; fatty alcohol alkoxylates, such as Plurafac® LF902, alcohol alkoxylates, such as Dehypon® LS-54 (R-$(EO)_5(PO)_4$); wherein R represents a linear or branched fatty alcohol residue) and Dehypon® LS-36 (R-$(EO)_3(PO)_6$; wherein R represents a linear or branched fatty alcohol residue); and capped alcohol alkoxylates, such as Plurafac® LF221 and Tegoten® EC11; mixtures thereof, or the like. More specifically the composition of the present application can include alkoxylated primary or secondary alcohol having from 6 to 24, preferably 6 to 22, more preferred 8 to 18 carbon atoms reacted with from 2 to 18 moles of ethylene, and/or propylene, and/or butylene oxide. In a preferred embodiment the nonionic has from 3 to 18 moles of alkylene oxide, in another preferred embodiment from 3 to 10 moles of ethylene oxide, and in yet another preferred embodiment 7 to 8 moles of EO. These materials are commercially available and well-known nonionic surfactants. The following materials are useful: lauryl alcohol ethoxylated with 3 moles of ethylene oxide (EO), coco alcohol ethoxylated with 3 moles EO, stearyl alcohol ethoxylated with 5 moles EO, mixed $C_{12}$-$C_{15}$ alcohol ethoxylated with 7 moles EO, mixed secondary $C_{11}$-$C_{15}$ alcohol ethoxylated with 7 moles EO, mixed $C_9$-$C_{11}$ linear alcohol ethoxylated with 6 moles EO and the like.

In some embodiment the nonionic has from 8 to 15 carbon atoms in the alkyl group. When this alkyl group is used a nonionic is the mixed $C_{12}$-$C_{15}$ alcohol ethoxylated with 7 moles EO. In a further preferred embodiment it comprises the alcohol alkoxylates, particularly the alcohol ethoxylates and propoxylates, especially the mixed ethoxylates and propoxylates, particularly with 3-7 oxyethylene (EO) units and 3-7 oxypropylene (PO) units such as the alcohol Dehypon® available from BASF Corporation, having 5 EO units and 4 PO units. In another preferred embodiment it comprises the alcohol alkoxylates, particularly $C_{11}$-$C_{14}$ alcohol (e.g. C13-rich alcohols), $C_{12}$-$C_{15}$ alcohol (e.g. mixed $C_{13}$/$C_{15}$ alcohol, iso-tridecanol), particularly with 2-20 oxyethylene (EO) units, preferably with 5-12 oxyethylene (EO) units, further preferred with 5-10 oxyethylene (EO) units, in particular with 7 or 8 oxyethylene (EO) units, such as the Lutensol® TO, particularly TO 8, available from BASF and Lutensol® AO, such as AO7 and AO3, available from BASF.

Suitable alkoxylated surfactants for use as surfactants further include Guerbet alcohol ethoxylates of the formula $R^6$—$(OC_2H_4)_m$—OH, wherein $R^6$ is a branched C9 to C20 alkyl group, preferably a branched $C_9$ to $C_{18}$ alkyl group, further preferred a branched $C_9$-$C_{15}$ alkyl group, more preferred a branched $C_9$-$C_{11}$ alkyl group, most preferred a branched $C_{10}$ alkyl group and m is from 2 to 10, preferably 2 to 6. Such Guerbet alcohols are available, for example, under the trade name Lutensol® XP or M from BASF or Eutanol® G from BASF.

The Guerbet reaction is a self-condensation of alcohols by which alcohols having branched alkyl chains are produced. The reaction sequence is related to the Aldol condensation and occurs at high temperatures under catalytic conditions. The product is a branched alcohol with twice the molecular weight of the reactant minus a mole of water. The reaction proceeds by a number of sequential reaction steps. At first the alcohol is oxidized to an aldehyde. Then Aldol condensation takes place after proton extraction. Thereafter the aldol product is dehydrated and the hydrogenation of the allylic aldehyde takes place.

These products are called Guerbet alcohols and are further reacted to the nonionic alkoxylated Guerbet alcohols by alkoxylation with i.e. ethylene oxide or propylene oxide. The ethoxylated Guerbet alcohols have a lower solubility in water compared to the linear ethoxylated alcohols with the same number of carbon atoms. Therefore the exchange of linear fatty alcohols by branched fatty alcohols makes it necessary to use good solubilizers which are able to keep the Guerbet alcohol in solution and the resulting emulsion stable even over a longer storage time.

Additional nonionic surfactants can include extended chain nonionic surfactants, such as products having the general formula R—$(PO)_a(EO)_b)$ wherein R represents a linear or branched fatty alcohol residue. Exemplary products include Lutensol XL series including $C_{10}$—$(PO)_a(EO)_b$, wherein a is 1.0 to 1.5 and b is 4 to 14, commercially available, for example as Lutensol XL-40, Lutensol XL-50, Lutensol XL-60, Lutensol XL-70, Lutensol XL-79, Lutensol XL-80, Lutensol XL-89, Lutensol XL-90, Lutensol XL-99, Lutensol XL-100, and Lutensol XL-140.

Additional nonionic surfactants can include alkyl polyglucosides. Exemplary alkyl polyglycosides include but are not limited to alkyl polyglucosides and alkyl polypentosides. Alkyl polyglycosides are bio-based non-ionic surfactants which have wetting and detersive properties. Commercially available alkyl polyglycosides may contain a blend of carbon lengths, including short chain carbons, such as chain lengths of less than Cu. In one example, suitable alkyl polyglycosides include $C_8$-$C_{10}$ alkyl polyglycosides and alkyl polyglycosides blends primarily containing C5-C10 alkyl polyglycosides. Suitable commercially available alkyl polyglucosides include Glucopon 215 UP and Glucopon 625 UP available from BASF Corporation. Alkyl polypentosides are commercially available from Wheatoleo. Suitable commercially available polypentosides include Radia Easysurf 6781, which contains chain lengths of about $C_8$-$C_{10}$.

In some embodiment the nonionic surfactant is an ethoxylated castor oil. Ethoxylated castor oil is an example of a PEG-modified triglyceride having ethylene oxide (EO) groups inserted between the glyceryl and fatty acid components. The EO groups may be substituted with either propylene oxide (PO) or butylene oxide (BO) groups, and/or combinations thereof. Triglycerides useful can include olive oil, soybean oil, and castor oil (i.e. mixture of triglycerides composed of several different fatty acids that is a monounsaturated fat with a one double carbon-carbon bond per arm of the triglyceride with a major component being ricinoleic acid and remainder of the oil being comprised of oleic, linoleic, stearic, and several other organic acids).

PEG-x castor oil (x=number of ethylene glycol units) results from ricinoleic acid (castor oil) reacted with ethylene oxide produces a polyethylene glycol modified castor oil, with the number of ethylene glycol units varying from as few as one to more than 100. The ethylene glycol portion of the molecule is hydrophilic (water soluble). This hydrophilic portion, coupled with the hydrophobic oil portion of the triglyceride, creates a nonionic surfactant molecule. These surfactant molecules can be used by formulators as excellent emulsifiers of conditioning agents, stabilizers, and thickeners. The ethylene glycol groups enhance the humectant properties of the castor oil molecule. PEG-castor oil molecules range from dispersible in aqueous solutions to completely water soluble, depending upon the PEG-#. When the PEG-# exceeds approximately 35, the molecule becomes completely water soluble.

Exemplary ethoxylated castor oils can include PEG modified triglyceride surfactants including those of the general formula: $R^1CO_2(CH_2CH_2O)_lCH_2CH(OCH_2CH_2)_m(O_2CR^2)CH_2(CH_2CH_2O)_nCO_2R^3$, where $R^1$, $R^2$, and $R^3$ are the same or different lipophilic moiety, a linear or branched, saturated or unsaturated, substituted or unsubstituted, aliphatic or aromatic hydrocarbon radical having from about 8 to 30 carbon atoms; and l, m, and n are the same or different number of moles of PEG, having from about 1 to 100 moles.

Without being bound by a particular theory, it is believed that the PEG-modified triglyceride acts as a classic Gemini surfactant, but whereas the classic Gemini surfactants have two hydrophilic head and hydrophobic tail pairings, the PEG-modified triglycerides have an additional head and tail pairing. Additional disclosure of the ethoxylated castor oil surfactants are disclosed in U.S. patent Ser. No. 17/305,363, which is herein incorporated by reference in its entirety.

In some embodiments, the nonionic surfactants are included in the laundry detergent composition at an amount of at least about 20 wt-% to about 90 wt-%, 30 wt-% to about 90 wt-%, 40 wt-% to about 90 wt-%, 50 wt-% to about 90 wt-%, about 50 wt-% to about 85 wt-%, about 50 wt-% to about 80 wt-%, about 55 wt-% to about 80 wt-%, or about 55 wt-% to about 75 wt-%. In addition, without being limited according to the invention, all ranges recited are inclusive of the numbers defining the range and include each integer within the defined range.

Water

The laundry detergent compositions include water and/or a carrier to provide a stable concentrate composition with at least the cationic amine surfactant and nonionic surfactant(s). In a preferred embodiment water is included as softened water, including zeolite softened water. In some embodiments, the water is included in the laundry detergent composition at an amount of at least about 0.1 wt-% to about 50 wt-%, about 0.1 wt-% to about 45 wt-%, about 0.1 wt-% to about 40 wt-%, about 1 wt-% to about 40 wt-%, about 1 wt-% to about 35 wt-%, about 1 wt-% to about 30 wt-%, about 1 wt-% to about 25 wt-%, or about 1 wt-% to about 20 wt-%. In addition, without being limited according to the invention, all ranges recited are inclusive of the numbers defining the range and include each integer within the defined range.

Carrier

The laundry detergent compositions include water and/or a carrier to provide a stable concentrate composition with at least the cationic amine surfactant and nonionic surfactant(s). In embodiments where a solid laundry detergent composition is provided a solid stable carrier is employed instead of or largely in place of water.

In addition to water, exemplary carriers include solvents such as lipophilic fluids. Examples of suitable lipophilic fluids include glycol ethers, glycerine derivatives such as glycerine ethers, perfluorinated amines, perfluorinated and hydrofluoroether solvents, low volatility nonfluorinated organic solvents, diol solvents, siloxanes, other silicones, hydrocarbons, other environmentally friendly solvents and mixtures thereof. In some embodiments, the solvent includes water, propylene glycol, and/or dipropylene glycol methyl ether.

In other aspects, examples of suitable carriers include, but are not limited to organic solvents, such as simple alkyl alcohols, e.g., ethanol, isopropanol, n-propanol, benzyl alcohol, and the like. Polyols are also useful carriers, including glycerol, sorbitol, and the like. Suitable carriers include glycol ethers. Suitable glycol ethers include diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, hexylene glycol, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, propylene glycol phenyl ether, and the like, or mixtures thereof.

Although preferred embodiments include water as the carrier, additional carriers can be employed with water (or replace water). In some embodiments, the carrier is included in the laundry detergent composition at an amount of at least about 0.1 wt-% to about 50 wt-%, about 0.1 wt-% to about 45 wt-%, about 0.1 wt-% to about 40 wt-%, about 1 wt-% to about 40 wt-%, about 1 wt-% to about 35 wt-%, about 1 wt-% to about 30 wt-%, about 1 wt-% to about 25 wt-%, or about 1 wt-% to about 20 wt-%. In addition, without being limited according to the invention, all ranges recited are inclusive of the numbers defining the range and include each integer within the defined range.

Additional Functional Ingredients

The components of the laundry detergent composition can further be combined with various functional components suitable for uses disclosed herein. In some embodiments, the laundry detergent composition including the cationic amine surfactant and nonionic surfactants, along with water make up a large amount, or even substantially all of the total weight of the laundry detergent compositions. For example, in some embodiments few or no additional functional ingredients are disposed therein.

In other embodiments, additional functional ingredients may be included in the laundry detergent compositions. The functional ingredients provide desired properties and functionalities to the laundry detergent compositions. For the purpose of this application, the term “functional ingredient” includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In some embodiments, the laundry detergent compositions may include optical brighteners, soil shielding/soil releasing agents (including soil release polymers), dye transfer inhibition/color protection agents, odor removal/odor capturing agents, defoaming agents, water conditioning agents, solubility modifiers, dispersants, metal protecting agents, soil antiredeposition agents, stabilizing agents, corrosion inhibitors, builders/sequestrants/chelating agents, enzymes, aesthetic enhancing agents including fragrances and/or dyes, additional rheology and/or solubility modifiers or thickeners, hydrotropes or couplers, buffers, solvents, additional cleaning agents and the like.

In some embodiments, in order to maintain the neutral pH range of the laundry detergent composition in use solution as well as provide stability for the cationic and nonionic surfactants, the following additional functional ingredients are not included in the compositions: bleaching agents, alkalinity agents, and the like.

According to embodiments of the invention, the various additional functional ingredients may be provided in a composition in the amount from about 0 wt-% to about 30 wt-%, from about 0 wt-% and about 25 wt-%, from about 0 wt-% and about 20 wt-%, from about 0.01 wt-% and about 20 wt-%, from about 0.1 wt-% and about 20 wt-%, from about 1 wt-% and about 20 wt-%, from about 1 wt-% and about 15 wt-%, from about 1 wt-% and about 10 wt-%, from about 2 wt-% and about 10 wt-%, from about 3 wt-% and about 10 wt-%, from about 4 wt-% and about 10 wt-%, or from about 5 wt-% and about 10 wt-%. In addition, without being limited according to the invention, all ranges recited are inclusive of the numbers defining the range and include each integer within the defined range.

Additional Surfactants

According to some embodiments, the composition may further comprise additional surfactants, including without limitation one or more zwitterionic, and/or amphoteric surfactants. Where utilized, the one or more additional surfactants may be present in the composition from about 0 wt-% to about 90 wt-%, inclusive of all integers between.

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in “Surfactant Encyclopedia” Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present application generally have the general formula:

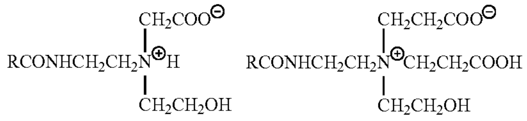

(MONO)ACETATE (DI)PROPIONATE

Neutral pH - Zwitterion

-continued

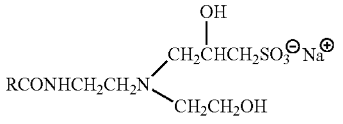

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R{=}C_8$-$C_{15}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this application include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

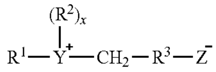

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

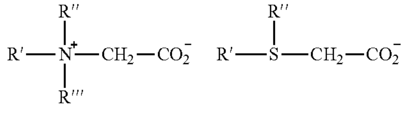

-continued

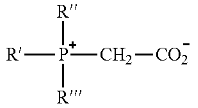

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present application include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

Optical Brighteners and Whitening Agents

The detergent compositions may include an optical brightener, also referred to as a fluorescent whitening agent or a fluorescent brightening agent. Brighteners are added to laundry detergents to replace whitening agents removed during washing and to make the clothes appear cleaner. Optical brighteners may include dyes that absorb light in the ultraviolet and violet region (usually 340-370 nm) of the electromagnetic spectrum, and re-emit light in the blue region (typically 420-470 nm). These additives are often used to enhance the appearance of the color of a fabric, causing a perceived "whitening" effect, making materials look less yellow by increasing the overall amount of blue light reflected.

Fluorescent compounds belonging to the optical brightener family are typically aromatic or aromatic heterocyclic materials often containing a condensed ring system. A feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (naphthalamides, triazines, etc.). The choice of optical brighteners for use in compositions will depend upon a number of factors, such as the type of composition, the nature of other components present in the composition, the temperature of the wash water, the degree of agitation, and the ratio of the material washed to the tub size. The brightener selection is also dependent upon the type of material to be cleaned, e.g., cottons, synthetics, etc. Because most laundry detergent products are used to clean a variety of fabrics, the detergent compositions may contain a mixture of brighteners which are effective for a variety of fabrics. Further, it can be common to employ different temperatures based on the types of fabrics to be washed, with this in mind, it is preferable to an optical brightener effective in low temperature and high temperature wash cycles. It is of course necessary that the individual components of such a brightener mixture be compatible. In a preferred embodiment, the detergent composition contains at least two optical brighteners.

Examples of suitable optical brighteners are commercially available and will be appreciated by those skilled in the art. At least some commercial optical brighteners can be classified into subgroups, including, but are not limited to derivatives of stilbene, pyrazoline, carboxylic acid, methinecyanines, dibenzothiophene-5,5-dioxide, azoles, 5- and 6-membered-ring heterocycles, and other miscellaneous agents. Examples of particularly suitable optical brightening agents include, but are not limited to: distyryl biphenyl disulfonic acid sodium salt, cyanuric chloride/diaminostilbene disulfonic acid sodium salt. Examples of optical brighteners are also disclosed in "The Production and Application of Fluorescent Brightening Agents," M. Zahradnik, Published by John Wiley & Sons, New York (1982), the disclosure of which is incorporated herein by reference. Suitable stilbene derivatives include, but are not limited to derivatives of bis(triazinyl)amino-stilbene, bisacylamino derivatives of stilbene, triazole derivatives of stilbene, triazine derivatives of stilbene, oxadiazole derivatives of stilbene, oxazole derivatives of stilbene, and styryl derivatives of stilbene.

One or more optical brighteners may be used in the compositions. In some embodiments, optical brightener(s) can be included in the compositions at an amount of from about 0.01 to about 5 wt. %, from about 0.1 wt. % to about 4 wt. %, or from about 0.2 to about 2 wt. %.

Methods of Use

The laundry detergent compositions are suited for various applications of use. Laundry and textile detergents are a particularly preferred application of use for the compositions, namely washing the textiles in an institutional or a household washing machine. The methods of use are particularly well suited for removing oily soils, including those difficult to remove soils from food, beverage and industrial applications. While not wanting to be held to a scientific theory, it is believed that the hydrophobic portion of these oily soils make the soil particularly difficult to remove from textiles. The hydrophobic portion of the soil may be an oil or a viscous solid. For example, some oils are more liquid in consistency than others.

The methods described herein are particularly well suited for removing soils from various textiles including polyester, cotton and polycotton blends where oil soils persist. For example, the textiles having extremely difficult removal and soils include, for example, mops including bar mops (e.g. cotton), napery (e.g. polyester), food service coats (e.g. polyester), industrial garments (e.g. polyester and polycotton), and shop towels (e.g. cotton). Each of these textiles are soiled with industrial oils that are challenging to remove and often result in replacing the textiles.

The method for washing textiles comprises providing the laundry detergent composition, in either solid or liquid form, and in either concentrate or use form, to an institutional or a household washing machine. In a preferred embodiment, the concentrate composition is provided and then diluted to an aqueous use solution.

The laundry detergent compositions are in contact with the textiles or surfaces in need of cleaning for a sufficient amount of time to clean the surface. In an embodiment, the surface is contacted with the laundry detergent composition for at least about 1 minute, at least about 2 minutes, at least about 3 minutes, or at least about 4 minutes, in each of the one or more steps within the laundering methods.

Any means of contacting can be used to place the textile surface in contact with the laundry detergent compositions, including for example, soaking, spraying, dripping, wiping, or the like. Included within the scope of contacting described herein, the textile can also be soaked, as is most common in a washing machine. As a result of the contacting step the textile is washed, and the soils removed.

The laundry detergent as disclosed herein can be added to a washing machine and at the same time an amount of alkali is added to the washing machine. The amount of alkali can be sufficient to raise the pH of the detergent above the pKa of the cationic amine surfactant present in the laundry detergent. The amount of alkali can be present in an amount that does not raise the pH of the use solution above the pKa of the cationic amine surfactant present in the laundry detergent.

In an embodiment, alkali is added to the washing machine after the laundry detergent. After the laundry detergent composition is added to the washing machine to contact and wash the textiles, there is a subsequent alkali step to increase the pH of the water containing the use solution of the laundry detergent composition. In an embodiment, the alkali step (which as referred to herein can include any alkaline detergent composition or alkali source, e.g. sodium carbonate, sodium hydroxide, etc. increases the pH of the laundry detergent use solution in the washing machine. In an embodiment, the alkali step increases the pH of the laundry detergent use solution to above the pKa for the cationic amine surfactant. In preferred embodiments the alkali step increases the pH of the laundry detergent use solution to above 7, preferably at least about 8, and more preferably at least about 9. In preferred embodiments, the alkali step increases the pH in the washing machine to between about 9 and about 14, or between about 10 and about 14. This second step of increasing alkalinity (even with a low level of alkalinity compared to conventional alkaline detergents) beneficially deprotonates the cationic amine surfactant provided in the first step from the neutral laundry detergent composition and causes it to be released from the fabric. As one skilled in the art will appreciate from the disclosure herein the increase in pH increases above the pKa of the cationic amine surfactant in the laundry detergent composition. The disclosure has unexpectedly found that the methods of using the laundry detergent composition benefit from use of lower levels of alkalinity to provide commercially acceptable cleaning performance (in addition to superior or at least substantially similar cleaning performance) to conventional alkaline detergent compositions which use increased concentrations of alkalinity and require a longer exposure time to the alkalinity to achieve effective cleaning of the textile substrates.

Thereafter, in some embodiments it is preferred to include a second application of the laundry detergent composition, such as after the draining of the alkali step from the washing machine. A second dosing of the laundry detergent composition is preferred for the most difficult to remove soils in laundering applications of use, such as cleaning bar mops or the like.

Thereafter the laundry detergent composition application and the alkali step application (and thereafter an additional optional laundry detergent composition application), there is a rinsing and draining step. Any number of rinsing and draining steps can be employed. The rinsing phase removes all suspended soils. The draining phase removes as much water from the wash tank and textiles as possible. In some cases, a wash cycle may have two rinsing phase and draining phases, i.e., a rinse cycle, an intermediate-drain cycle, a final rinse cycle, and a final drain cycle. After the wash cycle is complete, the resulting wastewater is typically removed and discarded.

Additional cleaning and/or bleaching applications can be employed in the methods of use following the rinsing and draining step(s). In any of the embodiments, an optional bleaching composition can be included in the methods of laundering. In any of the embodiments, an optional antichlor step can be included, such as a composition with a reducing agent to reduce or eliminate residual chlorine concentration in the water from a bleaching step. In any of the embodiments, an optional souring step can be included in the methods of laundering. Following any of these additional applications and steps a further rinsing and draining step is employed.

In additional embodiments, as according to typical cleaning methods, the washing process comprises a pre-wash or pre-soak where the textiles are wetted, and optionally a pre-soak composition can be added. In such embodiments the laundry detergent composition (and thereafter the alkali step) would follow the pre-soak composition. However, beneficially according to the compositions and methods described herein a pre-soak step is not required due to the efficacious removal of soils by the laundry detergent composition.

According to various embodiments of the methods described herein, the laundry detergent compositions can beneficially provide low alkalinity washing for the various textile surfaces. As the main wash step of a typical institutional or industrial laundry cycle has a use solution with both high surfactant and high alkalinity (about pH 11 or higher) this does not provide low alkalinity conditions. Beneficially, through the use of the neutral laundry detergent compositions followed by the alkali step, a decrease in alkalinity is used in comparison to traditional alkaline detergent compositions in a single washing step for laundry. In some embodiments the washing step employs about ≤500 ppm alkalinity, whereas a conventional alkaline detergent would employ at least about >1000 ppm alkalinity, and most commonly at least about 1000 ppm to about 3000 ppm alkalinity.

Although not required, for the various embodiments of the methods described herein, the laundry detergent compositions can beneficially provide efficacious cleaning for the various textile surfaces at low temperature washing. In preferred embodiments the washing step has a wash temperature about ≤150° F.

The methods described provide various benefits to removing soils from substrates, namely textiles. The removal of soils can be quantified by a reduction in visible residual oils on the textile, enhanced whiteness of the textile, and/or reduction of soils with hygienically clean confirmation. The whiteness of the textile can be measured using Y-values (with results providing commercially acceptable cleaning performance and improvement over control evaluations). The hygienically clean confirmation of the textile can be measured by sampling surface bacteria (reported on per $in^2$) on the cleaned textile, by TRSA approved certification test methods by sampling surface bacteria (reported on per $dm^2$), and/or by mold/yeast testing of the cleaned textile (reported on per $dm^2$ or $in^2$) (with results providing commercially acceptable cleaning performance and improvement over control evaluations).

In an embodiment the methods providing these beneficially results of removing soils from substrates can also be achieved through reduction (i.e. removal of a step) of water consumption through a rinse step.

EMBODIMENTS

The present disclosure is further defined by the following numbered paragraphs:

1. A laundry detergent composition comprising:
   a cationic amine surfactant having one of the following general structures:

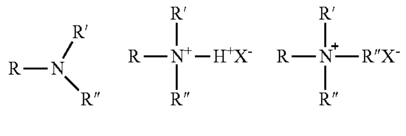

wherein R is an alkyl chain, R', R", and R'" may be either long alkyl chains or
   smaller alkyl or aryl groups or hydrogen and X is an anion;
   at least one nonionic surfactant; and
   water and/or a carrier suitable for a solid composition;
   wherein a pH of the laundry detergent in a use composition is between about 6 to about 9.

2. The composition of paragraph 1, wherein the cationic amine surfactant is a multi-branched cationic amine, an ethoxylated amine, polyamine, or a quaternary ammonium compound.

3. The composition of paragraph 1, wherein the cationic amine surfactant is selected from the group consisting of N-(3-aminopropyl)-N-dodecylpropane-1,3-diamine, N-(3-aminopropyl)-N-dodecylpropane-1,3-diamine, N, N-Bis (3-aminopropyl) dodecylamine, N1,N1,N3-tris(3-aminopropyl)-N3-dodecylpropane-1,3-diamine, N1,N1-bis(3-aminopropyl)-N3-dodecylpropane-1,3-diamine, N1-(3-aminopropyl)-N3-dodecylpropane-1,3-diamine, N-dodecylpropane-1, 3-diamine, N,N-bis(3-aminopropyl)-octylamine, N,N-bis(3-aminopropyl)-dodecylamine, 4-aminomethyl-1,8-octanediamine, 1,3,5-tris-(aminomethyl)-benzene, 1,3,5-tris-(aminomethyl)-cyclohexane, tris-(2-aminoethyl)-amine, tris-(2-aminopropyl)-amine, tris-(3 aminopropyl)-amine, and coco alkylbis(hydroxyethyl)methyl, ethoxylated, ammonium chloride.

4. The composition of paragraph 1, wherein the cationic amine is N-(3-aminopropyl)-N-dodecylpropan-1,3-diamine or a coco alkylbis(hydroxyethyl)methyl, ethoxylated, ammonium chloride.

5. The composition of any one of paragraphs 1-4, wherein the cationic amine surfactant comprises between about 0.5 wt-% to about 20 wt-%, or between about 1 wt-% to about 10 wt-%, or between about 5 wt-% to about 10 wt-% of the composition.

6. The composition of any one of paragraphs 1-5, wherein the nonionic surfactants are a fatty alcohol alkoxylate, alcohol alkoxylate, EO/PO block copolymers, ethoxylated castor oil, alkyl polyglucosides, or combinations thereof.

7. The composition of paragraph 6, wherein the nonionic surfactant is a fatty alcohol ethoxylate, alcohol ethoxylate, EO/PO block copolymers or combination thereof.

8. The composition of any one of paragraphs 1-7, wherein the nonionic surfactants comprise between about 20 wt-% to about 90 wt-%, or between about 50 wt-% to about 80 wt-%, or between about 55 wt-% to about 80 wt-% of the composition.

9. The composition of any one of paragraphs 1-8, wherein the water or carrier comprises between about 0.1 wt-% to about 50 wt-%, or between about 0.1 wt-% to about 40 wt-%, or between about 1 wt-% to about 30 wt-% of the composition.

10. The composition of any one of paragraphs 1-9, further comprising at least one additional functional ingredient selected from the group consisting of optical brighteners, soil release polymers, solubility modifiers, dispersants, stabilizing agents, water conditioning agents, enzymes, builders/sequestrants/chelating agents, rheology and/or solubility modifiers, hydrotropes or couplers, and solvents.

11. The composition of paragraph 10, wherein the additional functional ingredient(s) comprise between about 0.1 wt-% to about 20 wt-%, or between about 1 wt-% to about 20 wt-%, or between about 1 wt-% to about 10 wt-% of the composition.

12. The composition of any one of paragraphs 1-11, wherein the cationic amine surfactant comprises from about 1% to about 15% on an actives basis of the total surfactant concentration of the composition, from about 5% to about 15% on an actives basis of the total surfactant concentration of the composition, from about 8% to about 12% on an actives basis of the total surfactant concentration of the composition, or about 10% on an actives basis of the total surfactant concentration of the composition.

13. The composition of any one of paragraphs 1-12, wherein the pH of the laundry detergent use composition is between about 7 to about 9, between about 7 to about 8, or about 7.

14. A method of washing textiles comprising: contacting textiles with the laundry detergent composition according to any one of paragraphs 1-13 or 29-30 and an alkalinity source comprising a source of alkalinity or an alkaline detergent composition; and washing the textiles in an institutional or a household washing machine to remove soils.

15. The method of paragraph 14, wherein the contacting textiles comprises a 2-step cleaning wash process comprising first contacting the textiles with the laundry detergent composition at a pH between about 6 to about 9 during a wash cycle, and thereafter contacting the textiles with an alkali step to increase the pH above the pKa of the cationic amine surfactant.

16. The method of any one of paragraphs 15-16, further comprising diluting the laundry detergent composition at a point of use with water to form an aqueous use solution of the composition.

17. The method of paragraph 16, wherein the aqueous use solution of the composition has a pH between about 7 and about 9.

18. The method of any one of paragraphs 15-17, wherein the contacting of the textiles with the alkali step increases the pH above 9.

19. The method of any one of paragraphs 14-18, wherein a second application of the laundry detergent composition according to any one of paragraphs 1-13 or 29-30 at a pH between about 6 to about 9 during a wash cycle follows the alkali step.

20. The method of any one of paragraphs 14-19, wherein the soils are industrial oils.

21. The method of any one of paragraphs 14-20, wherein the textile comprises at least one of polyester, cotton or poly-cotton blends.

22. The method of paragraph 20, wherein the textile is one or more of a mop, napery, food service coat, industrial garment, or towels.

23. The method of any one of paragraphs 14-22, wherein the wash cycle has a wash temperature about ≤150° F.

24. The method of any one of paragraphs 14-23, wherein the wash cycle provides about ≤500 ppm alkalinity for a low alkalinity laundry program.

25. The method of any one of paragraphs 14-24, wherein the wash cycle further comprises a rinsing phase and draining phase.

26. The method of any one of paragraphs 14-25, wherein the wash cycle further comprises a bleaching step, antichlor step and/or souring step.

27. The method of any one of paragraphs 14-26, wherein the method increases the amount of oil removal from the textile in comparison to a wash cycle that does not include the cationic amine surfactant.

28. The method of any one of paragraphs 14-27, wherein the removal of soils is a reduction in visible residual oils on the textile, enhanced whiteness of the textile and/or reduction of soils with hygienically clean confirmation.

29. The composition of any one of paragraphs 1-13, wherein the composition is a solid or liquid.

30. The composition of paragraph 29, wherein the composition is diluted with water at ratio of from about 1:10 to about 1:10,000 (composition to water).

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following materials were used in the Examples:

Lonzabac 12—N-(3-aminopropyl)-N-dodecylpropan-1,3-diamine cationic amine surfactant Tomamine Q-C-15—coco alkylbis(hydroxyethyl)methyl, ethoxylated, ammonium chloride cationic amine surfactant Variquat CC42 NS—a polypropoxy quaternary ammonium chloride cationic amine surfactant PEA 25—polyethoxylated cationic amine surfactant Tomamine DA-14—Isodecycloxypropyl-1,3-diaminopropane cationic amine surfactant Tomamine DA-17—Isotridecyloxypropyl-1,3-diaminopropane cationic amine surfactant Triameen OV—oleyl dipropylene triamine cationic amine surfactant PEG cocoamine—polyethylene glycol coconut amine cationic amine surfactant Alkali—50% active NaOH

Example 1

Oils on polyester have traditionally been difficult to remove due the strong attractive forces between hydrophobic soils and hydrophobic substrates. This is especially challenging given the minimal mechanical action characteristic of tunnel washers. This is a further challenge at sites using lower wash temperatures and low alkalinity conditions, presenting multiple challenges. The described analysis of this Example has been found to represent field applications, to be replicable, and to differentiate between chemistries, and was therefore used to assess the efficacy of the addition of cationic amines to a nonionic surfactant detergent package. The modified formulations were evaluated for improved performance in laundry as measured by reducing visibility of food and beverage oils on polyester substrates. The evaluated formulations containing the cationic amine surfactant Lonzabac are shown in Tables 2-4. The corresponding controls to each, respectively Control A, Control B, and Control C do not contain the cationic amine surfactant and instead contain the same wt-% of additional water. Each control was modified to replace water with the Lonzabac cationic amine surfactant. 1 g/L alkali was added to each formulation during testing.

TABLE 2

| Composition A1 | |
|---|---|
| Component | Wt-% |
| $C_{12}$-$C_{16}$ alcohol ethoxylate nonionic surfactant | 50-55 |
| C12-C14 alcohol alkoxylate | 22-27 |
| Lonzabac | 6-8 |
| Additional functional ingredients | 10-15 |
| Water | 5-20 |
| Total | 100 |

TABLE 3

| Composition B1 | |
|---|---|
| Component | Wt-% |
| $C_{12}$-$C_{16}$ alcohol ethoxylate nonionic surfactant | 35-40 |
| C10-Guerbet alcohol alkoxylate | 20-25 |
| Lonzabac | 6-8 |
| Additional functional ingredients | 15-18 |
| Water | 15-20 |
| Total | 100 |

TABLE 4

| Composition C1 | |
|---|---|
| Component | Wt-% |
| Fatty alcohol ethoxylate (ethoxylated C11-13-iso, C13 rich alcohol) nonionic surfactant | 30-35 |
| Fatty alcohol alkoxylate nonionic surfactant | 30-35 |
| Lonzabac | 6-8 |
| Additional functional ingredients | 8-12 |
| Water | 15-20 |
| Total | 100 |

4"×4" swatches of green polyester (i.e. equivalent to commercial napkin textiles) were cut using a rotary cutter. The swatches were marked using industrial black Sharpie marker. Then 50 μL of olive oil was pipetted in the center of each swatch using a micropipetter. The soil was incubated at room temperature for 20-30 minutes. Then each tergotometer pot was filled with 1 L of water. The evaluated chemistries were weighed and once the tergotometer pots reached the set temperature using a thermometer the tergotometer was set to agitation and timer began. The temperature was evaluated at 140° F. for low temperature conditions. The weigh boats containing the evaluated chemistries, including alkali, were dropped immediately into each pot after starting the tergotometer. The swatches were removed from pots when the alarm rang at 15 minutes. Then swatches were rinsed for 2 minutes in cold 0 Grain water, and then ironed (or dried using a drying cabinet).

Swatches were evaluated using a visual score where scores of 4, 3, 2, and 1 indicating (4) no stain, (3) slight stain, (2) moderate stain, and (1) dark stain respectively. Any increase in the stain rating (i.e. reduction in the visual stain presence) has been shown to be a significant soil removal in the field of industrial oily soils. The visual improvement in the laboratory test consistently results in overall soil control that is meaningful and significant. The results are shown in FIG. 1, where the addition of the cationic amine surfactant to each of the evaluated Control A, Control B, and Control C improved performance by reducing the visibility of the food and beverage oils on polyester substrates (e.g. evaluated as coupon equivalent to napkins with oily soils).

Example 2

Additional evaluations of the cationic amine surfactant Lonzabac in Compositions A1, B1, and C1 as shown in Tables 2-4 were compared to the corresponding controls Control A, Control B, and Control C for the evaluation of soil removal from cotton substrates. Ig/L alkali was added to each formulation. For testing to assess percentage of residual oil the following food soil was prepared on towel (terry) swatches cut in 4×4 squares (inches). The soils were then prepared for adding onto the towel swatches. First in ajar, a 2:2:1 ratio (by weight) of Olive Oil:Crisco:Annatto Dyed Corn Oil were mixed and then microwaved briefly to melt Crisco and created homogenous solution. Then the soil was pipetted in 4 g increments on the center of terry towel square. The towel was folded in half over soil and pressed into the weave of the towel. Towel swatches were marked using a Tach-it. Then it was placed on an oven-safe tray and soils were baked for 2 hours at 50° C. Then swatches were ready for testing. Each tergotometer pot was filled with 1 L of water and chemistry weighed for each tergotometer into a weigh boat. Once the water in the tergotometer pots reached set temperature of 135° F. using a thermometer, the agitation began and weigh boats containing the evaluated chemistries, including alkali, were dropped immediately into each pot after starting the tergotometer. When an alarm sounded at 15 minutes the swatches were removed from the pots and rinsed for 2 minutes in cold 0 Grain water. Then the swatches were dried in a drying cabinet. Then the bar mop swatches were evaluated by % residual soil analysis.

For % residual soil analysis, a 4-gram sample is cut from the test piece. The sample and 40 mL of hexane were added to a centrifuge tube. Samples were shaken for 30-60 minutes on a shaker, and 8 mL is taken out and placed in a pre-weighed vial. After hexane evaporated, the vial was weighed and % residual soil can be calculated.

Figure 2:
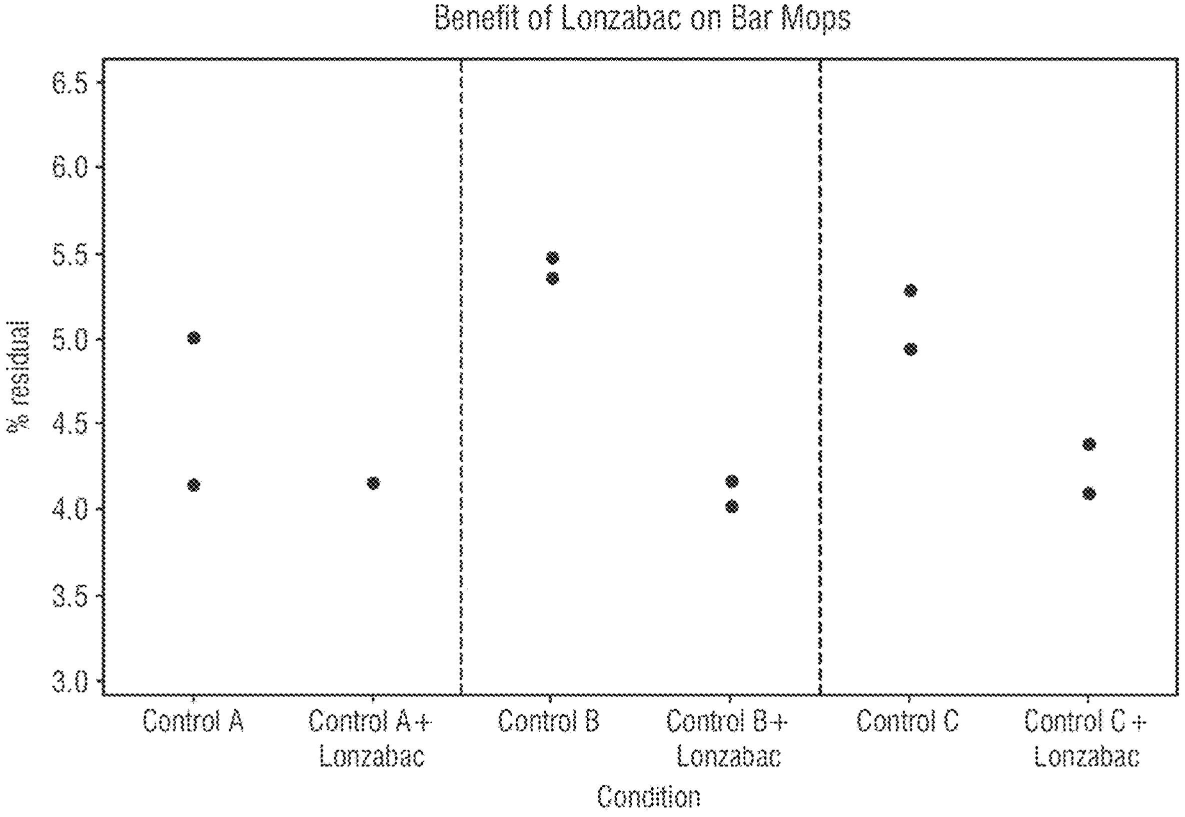
FIG. 2 shows the efficacy of adding a cationic amine surfactant in soil removal on bar mops soiled with oily stains with a decrease in residual oil on the textile using laundry detergent compositions according to the disclosure as evaluated in Example 2.

The results are shown in FIG. 2, where the addition of the cationic amine surfactant to each of the evaluated Control A, Control B, and Control C improved performance by reducing the percentage of residual oils on the swatches. The addition of the cationic amines to a nonionic surfactant detergent package improved performance by increasing the amount of oil removal (as demonstrated by less residual oil being extracted from the linen) of F&B oils on cotton substrates.

Example 3

Additional evaluations of the cationic amine surfactant Lonzabac in Compositions A1, B1, and C1 as shown in Tables 2-4 were compared to the corresponding controls Control A, Control B, and Control C for the evaluation of industrial soil removal from cotton substrates. 1 g/L alkali was added to each formulation. For testing to assess percentage of soil removal the following soil was prepared on precut cotton, polycotton, and polyester substrates in approximately 1.5×3 inch squares. 100 μL of DMO (Dirty Motor Oil) was added in the center of each swatch using micropipetter for the analysis of soil removal with the bar mops for assessing industrial soils. The soils were then incubated at room temperature overnight. Each tergotometer pot was filled with 1 L of water and chemistry weighed for each tergotometer into a weigh boat. Once the water in the tergotometer pots reached the set temperature of 145° F. using a thermometer, the agitation began and the weigh boats containing the evaluated chemistries, including alkali, were dropped immediately into each pot after starting the tergotometer. When an alarm sounded at 10 minutes the swatches were removed from the pots and rinsed for 2 minutes in cold 0 Grain water. Then the swatches were dried in a drying cabinet. Then industrially soiled swatches were evaluated by scanning on the HunterLab, for percent soil removal.

Figure 3:
FIG. 3 shows the efficacy of adding a cationic amine surfactant to a laundry detergent for improvement in industrial soil removal on various substrates including cotton, polycotton and polyester as evaluated in Example 3.

The percentage of soil removed results are shown in FIG. 3, where the addition of the cationic amine surfactant to each of the evaluated Control A, Control B, and Control C improved performance of industrial oil removal on cotton substrates, showed some performance impact on industrial oil removal on polyester substrates, while not showing an improvement on polycotton substrates. Without being limited to particular mechanism of action, there is improvement seen cotton substrates in part due to the use of Lonzabac as the cationic amine surfactant which as a stronger affinity to cotton substrates.

Example 4

Figure 5:
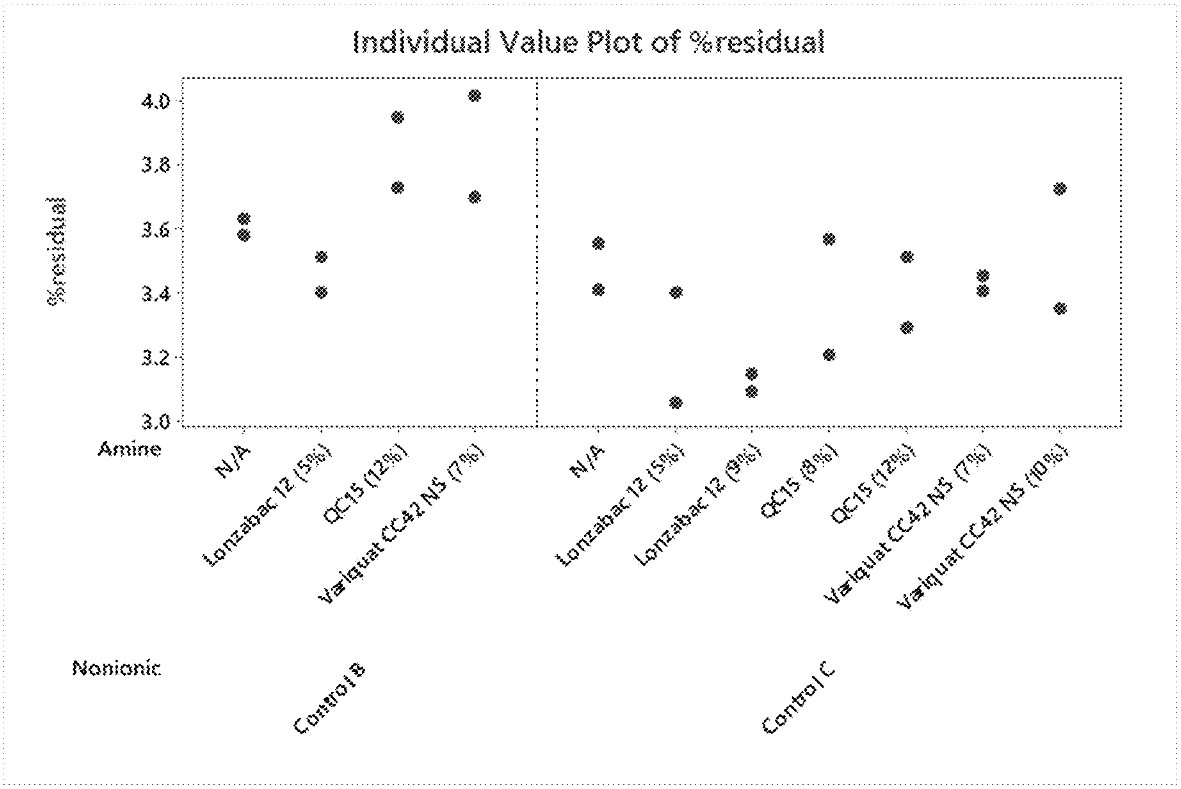
FIG. 5 shows the percentage residual soil removed using various compositions containing cationic amine surfactants with nonionic surfactants followed by an alkali step as evaluated in Example 4.

Additional testing to evaluate the use of cationic amine surfactants was completed according to the same methodology of Example 2, with the exception that the corn oil soil utilized was undyed and a 3-gram soil sample was pipetted onto each towel. The nonionic surfactant/cationic amine surfactant combinations and formulations used were as generally shown in Compositions B1 and C1, with modifications to the concentration and type of cationic amine surfactant as shown in FIG. 5. The results in FIG. 5 show that beneficially the performance benefit of cationic amine surfactants is not limited to a single type of cationic amine, there are performance benefits achieved for multi-branched cationic amines, ethoxylated amines, and quaternary ammonium compounds.

Without being limited to a particular mechanism of action, the results showing that cationic amines outperform the quaternary ammonium compounds may result from the cationic amines attaching to form hydrotropes with the negatively charged industrial oils.

Example 5

Field tests were conducted to evaluate % residual soil on used bar mops with real world soils, textiles, and laundering equipment. The "Baseline" condition utilized a main cleaning step at 165° F. and greater than 2,000 ppm alkalinity. The "Inline" and experimental formulations Composition D and Composition E utilized a temperature of less than 150° F. and 500-800 ppm alkalinity. Experimental formulations Composition D and Composition E are outlined in Tables 5 and 6, respectively. Neither the Baseline nor the Inline compositions comprise a cationic amine surfactant.

TABLE 5

Composition D

| Component | Wt-% |
|---|---|
| Nonionic Surfactant: Oxirane, 2-methyl-, polymer with oxirane, mono(2-propylheptyl) ether | 30-60 |
| Nonionic Surfactant: Poly(oxy-1,2-ethanediyl), alpha-isotridecyl-omega-hydroxy- | 30-60 |
| Solvent: 2-methylpentane-2,4-diol | 5-10 |
| Water | 5-20 |
| Lonzabac | 5-10 |
| Total | 100 |

TABLE 6

Composition E

| Component | Wt-% |
|---|---|
| Nonionic Surfactants: Alcohols, C10-C16, ethoxylated | 60-90 |
| Solvent: 2-methylpentane-2,4-diol | 5-10 |
| Water | 5-20 |
| Lonzabac | 5-10 |
| Total | 100 |

Figure 6:
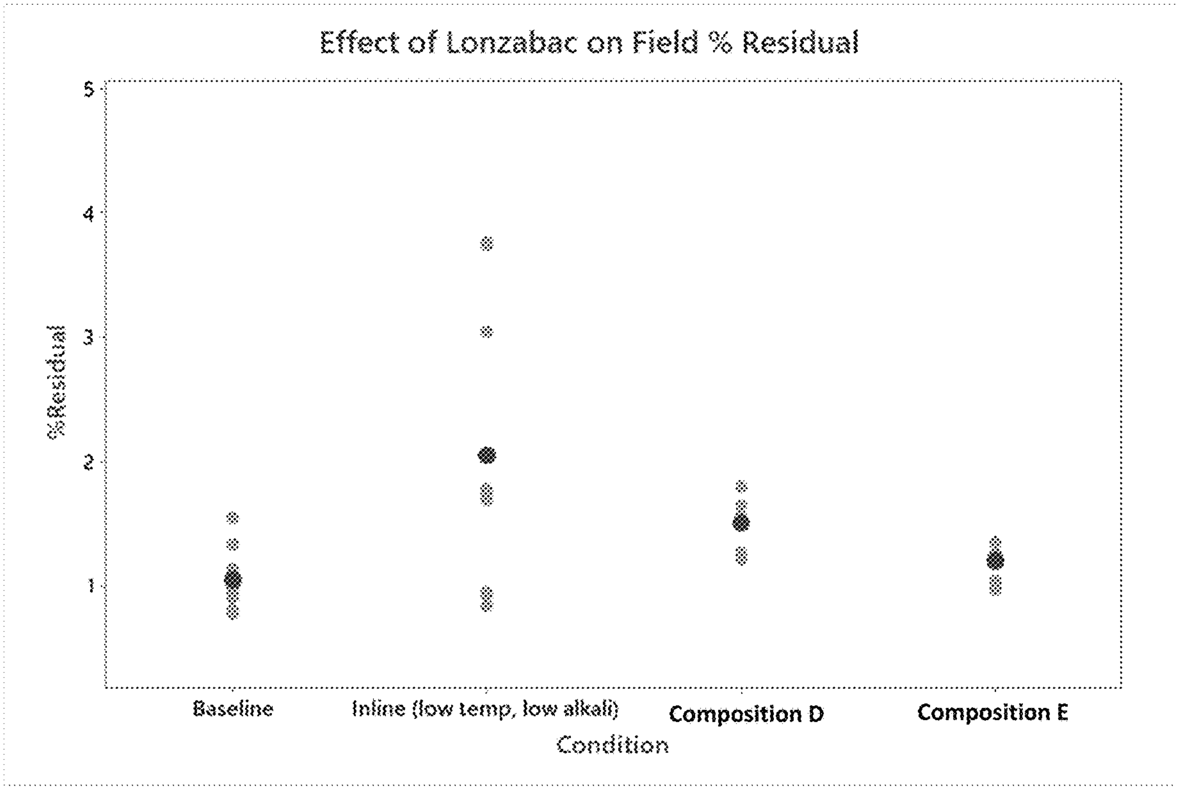
FIG. 6 shows the efficacy of adding a cationic amine surfactant in soil removal on bar mops soiled with oily stains using laundry detergent compositions as evaluated in Example 5.

Percent residual soil per condition is plotted in FIG. 6. The experimental formulations with Lonzabac have less residual soil than the Inline low temperature, low alkali formulation and are comparable to the high temperature, high alkalinity baseline formulation.

Example 6

Figure 7:
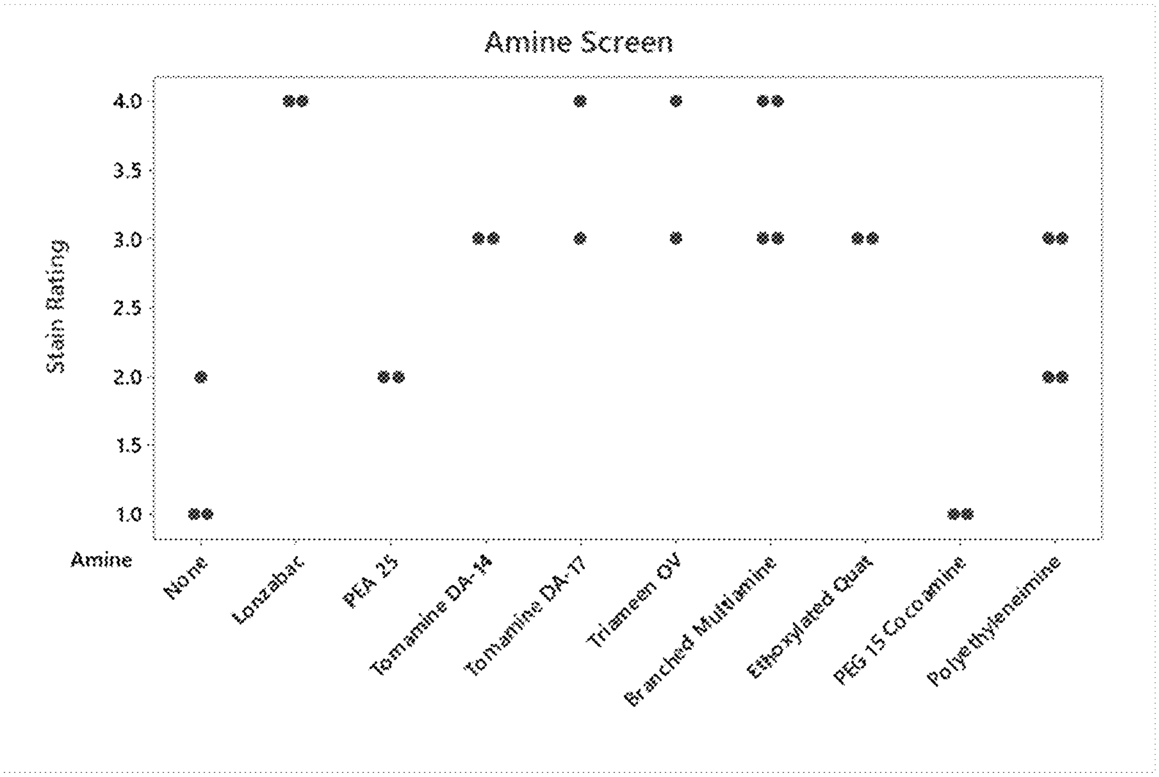
FIG. 7 shows the efficacy of adding a cationic amine surfactant to a laundry detergent for improvement in stain rating on napkins soiled with oily stains as evaluated in Example 6.

The stain rating of various amines as added to a nonionic detergent formulation was evaluated as outlined in Example 1. The results are shown in FIG. 7, wherein "none" indicates the nonionic detergent composition without cationic amine surfactant. As demonstrated in FIG. 7, a wide range of cationic amines positively affect stain rating when added to a nonionic detergent composition. The nonionic detergent composition utilized herein is shown in Table 7.

TABLE 7

Nonionic Detergent Composition

| Component | Wt % |
|---|---|
| PEG hydrogenated castor oil | 5-15 |
| C13 alcohol ethoxylate nonionic surfactant | 5-15 |
| C9-11 alcohol ethoxylate nonionic surfactant | 35-50 |
| 2-methylpentane-2,4-diol | 5-10 |
| Water | 15-20 |
| Total | 100 |

Figure 4:
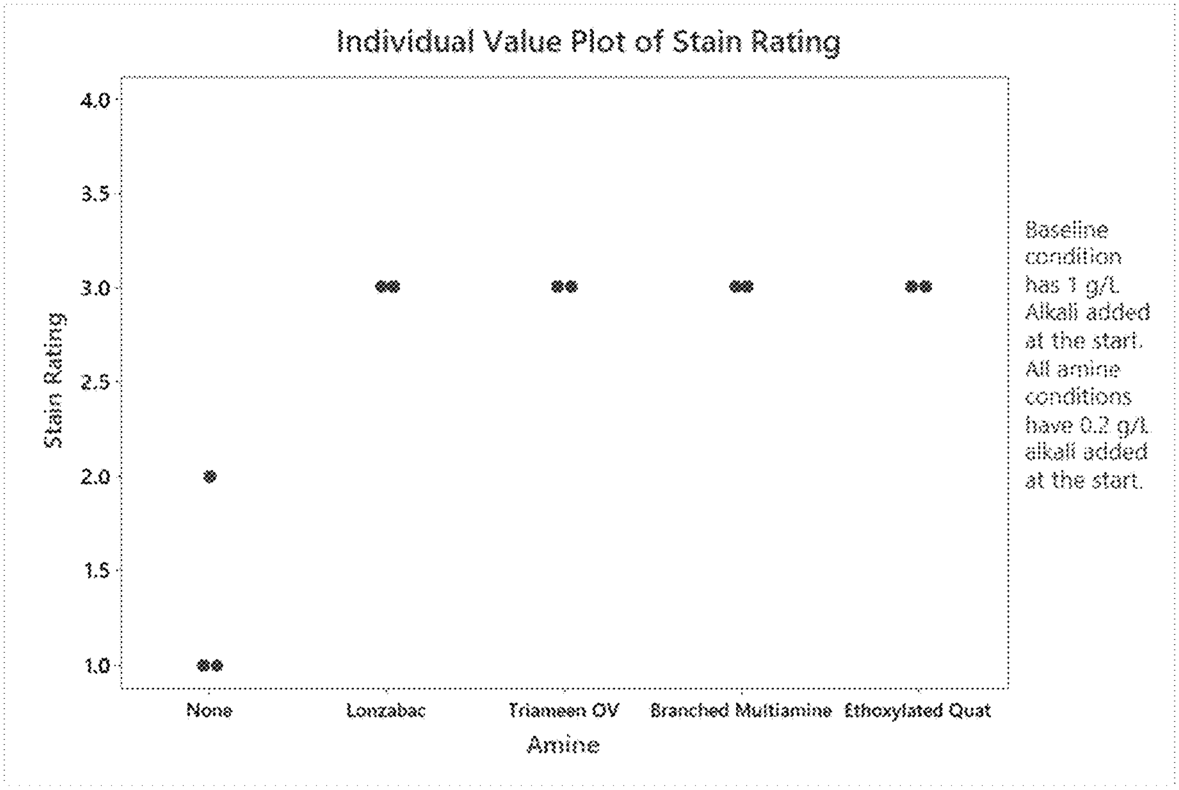
FIG. 4 shows the efficacy of adding a cationic amine surfactant to a laundry detergent with alkali for improvement in stain rating as evaluated in Example 7.

In addition, the stain rating of several of the amines was evaluated wherein 0.2 g/L alkali was added at the same time as the laundry detergent and cationic amine. The baseline condition ("none") indicates the nonionic laundry detergent outlined in Table 7, plus 1 g/L alkali. The results are shown in FIG. 4. As shown in FIG. 4, the addition of a cationic amine to a nonionic laundry detergent beneficially impacts stain rating, even with a lower amount of alkali.

The stain rating of several of the amines was evaluated wherein 1 g/L alkali was added 4 minutes after the cationic amine formulation. It has been discovered that the application of cationic amine surfactant with the nonionic surfactant(s) in combination with a separate alkali step affects the realization of the benefits of adding the cationic amine surfactant.

Figure 8:
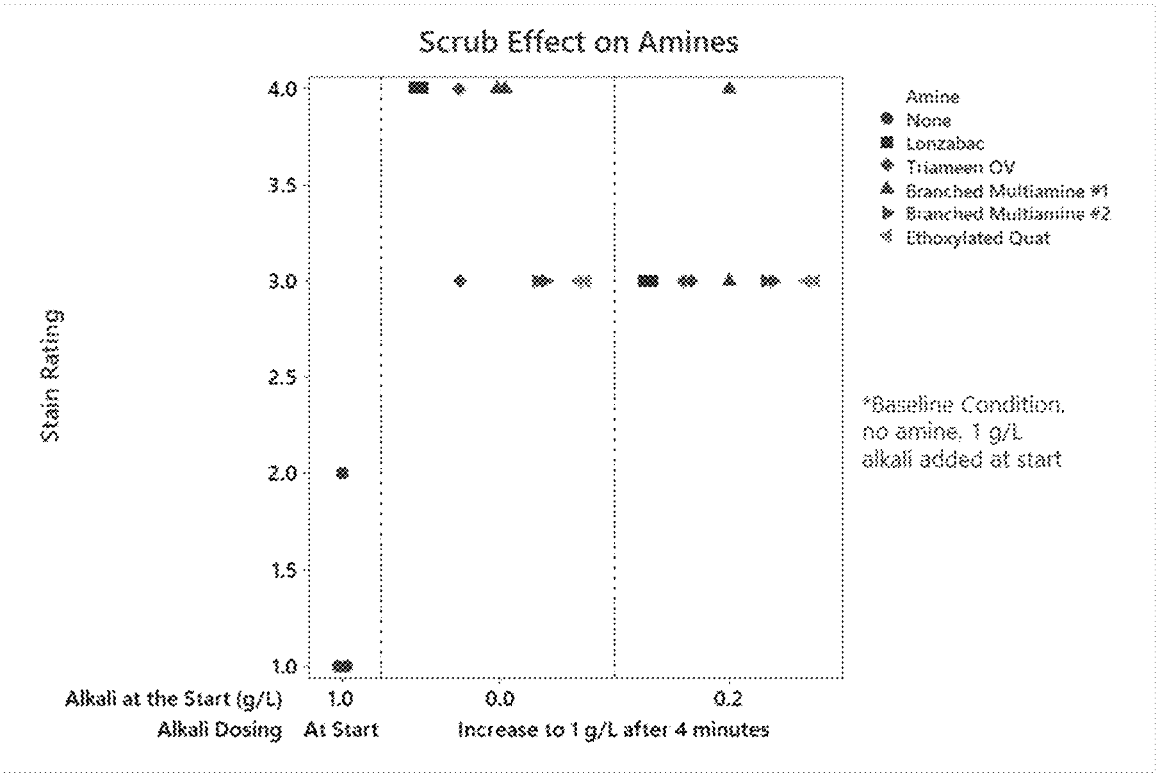
FIG. 8 shows the impact of the addition of an alkali step in combination with a cationic amine surfactant on stain rating as evaluated in Example 6.

The results are shown in FIG. 8. As shown in FIG. 8, a 2-step process with a neutral scrub, followed by a low level of alkalinity, may benefit some amines more than others, but does not inhibit the performance of any.

Example 7

The stain rating of various amines is evaluated as outlined in Example 1, with a lower dose of Lonzabac. In this Example, napkins were treated with 720 ppm total detergent, with Lonzabac at a weight ratio of Lonzabac to nonionic detergent of either 1:12 or 1:9. The nonionic detergent is shown in Table 7. Tests were run with no alkali or with 1 g/L alkali added after 4 minutes.

Figure 9:
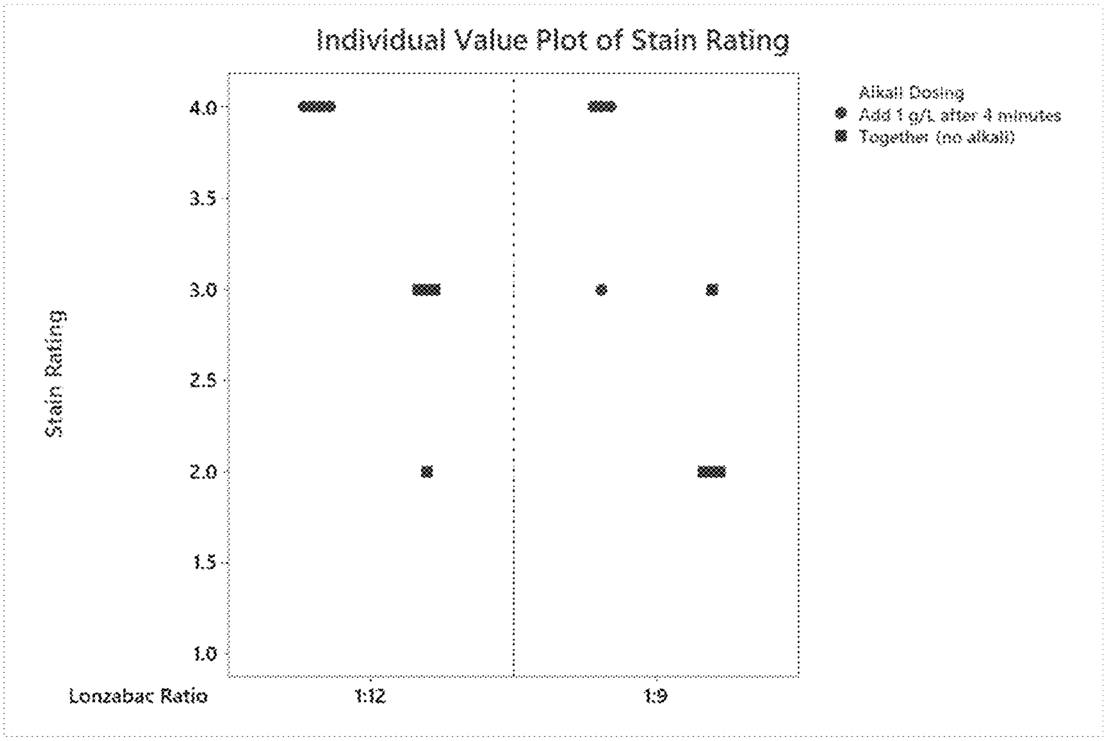
FIG. 9 shows the efficacy of a low dose of cationic surfactant in combination with an alkali step on stain rating as evaluated in Example 7.

The results are shown in FIG. 9. Without cationic amine, the baseline stain ratings are at 1. As shown in FIG. 9, the addition of a cationic amine positively affects stain rating even at low ratio of cationic amine to nonionic detergent. These results also confirm the benefits of a 2-step process with a neutral scrub, followed by a low level of alkalinity.

Example 8

Figure 10:
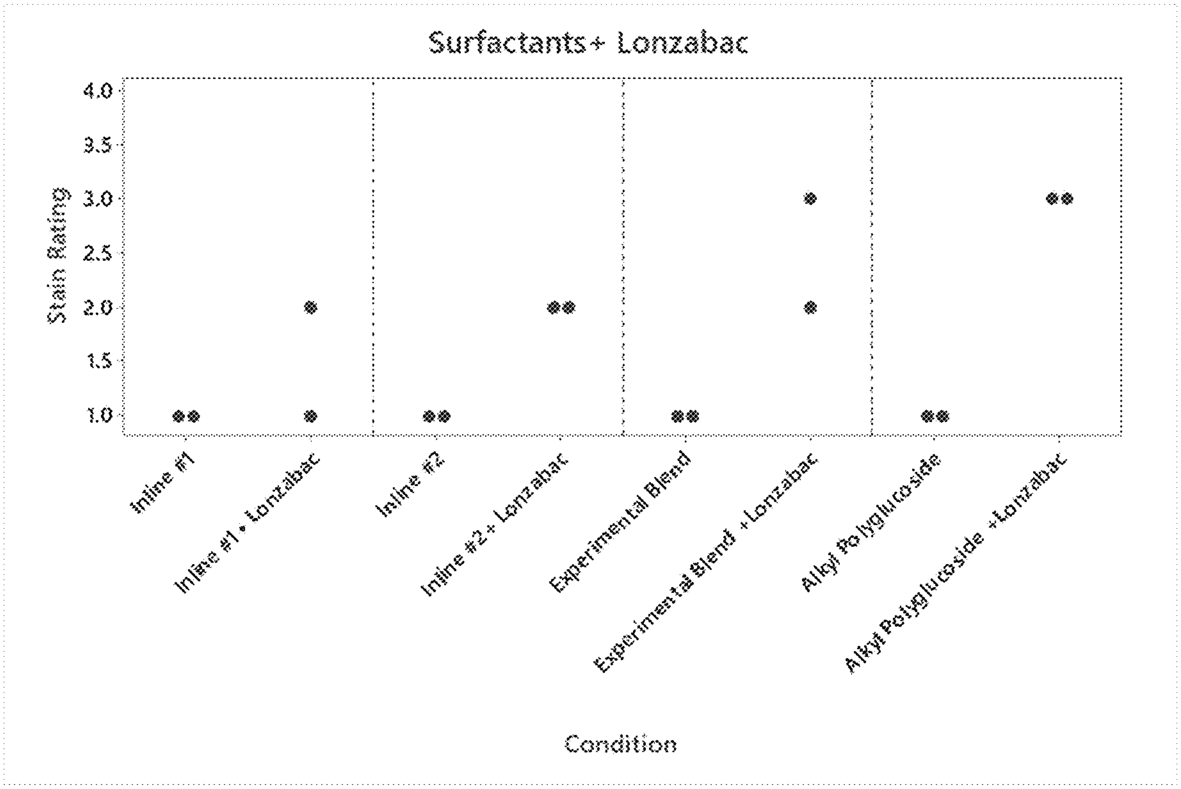
FIG. 10 shows the efficacy of the addition of a cationic surfactant with various nonionic surfactants on stain rating as evaluated in Example 8.

The stain rating of several nonionic surfactants, with and without a cationic surfactant, is evaluated as outlined in Example 1. "Inline #1" is the same formulation as Control A described in Example 1 and "Inline #2" is the same formulation as Control B described in Example 1. "Experimental Blend" is according to Table 7. For each formulation, 1 g/L active nonionic surfactant was used and 0.1 g/L Lonzabac was added for the experimental formulations. The stain ratings are shown in FIG. 10. As shown in FIG. 10, the stain rating of each type of nonionic surfactants is enhanced by the addition of a cationic amine surfactant.

Example 9

Figure 11:
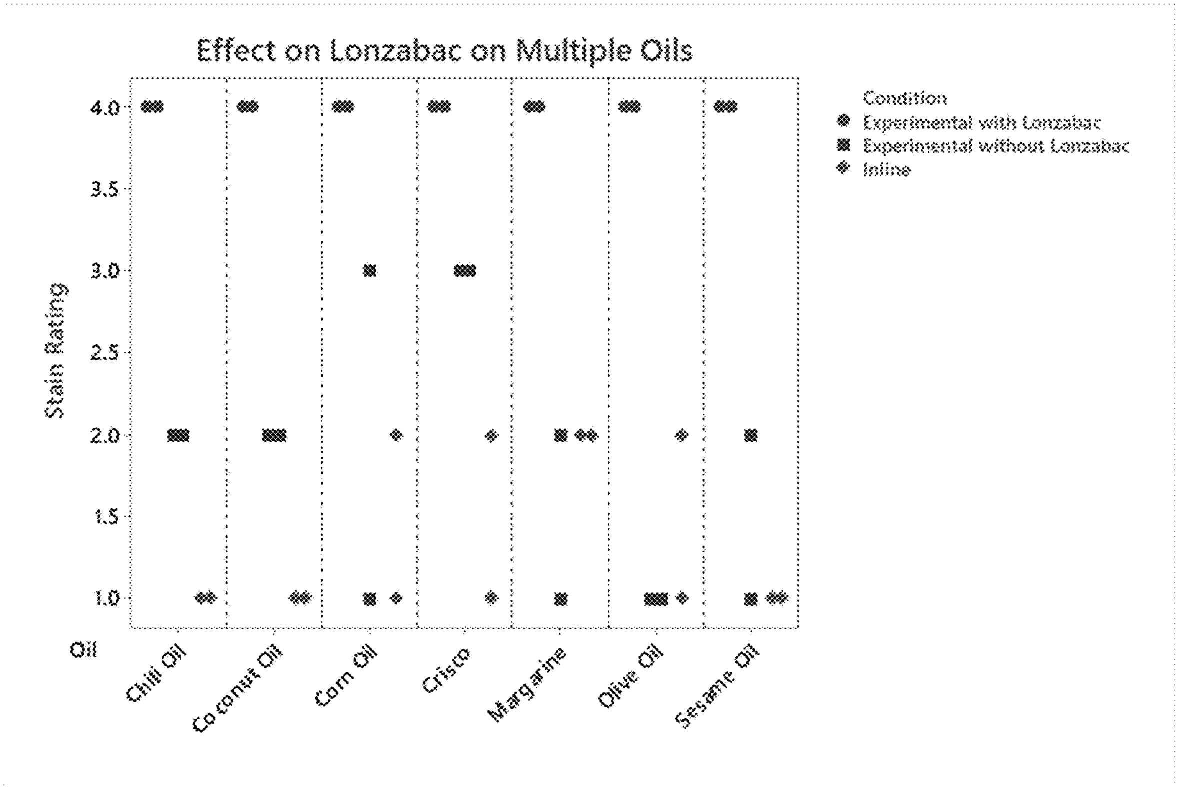
FIG. 11 shows the impact of adding a cationic amine surfactant to a laundry detergent on the stain rating of multiple oils as evaluated in Example 9.

The stain rating for multiple oils was evaluated as outlined in Example 1. In this Example, 10 wt-% Lonzabac was added to the nonionic detergent formulation according to Table 7, and compared to Control A described in Example 1 (labeled "Inline" in FIG. 11). As can be seen from FIG. 11, the addition of a cationic surfactant positively impacted the Experimental formulation, as no stain was detected for a variety of oils.

Figure 12:
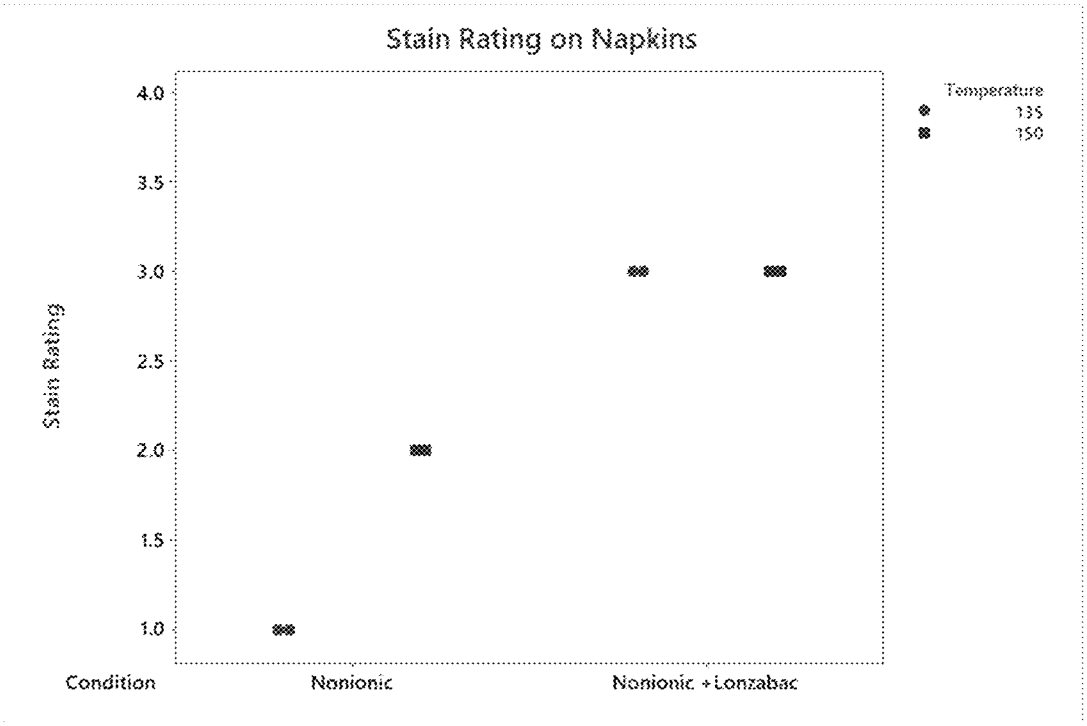
FIG. 12 shows the efficacy of adding a cationic amine surfactant to a laundry detergent on stain rating at varying temperatures as evaluated in Example 9.

Additionally, the stain rating at both 135° F. and 150° F. with and without cationic amine surfactant was evaluated. For this test, the nonionic formulation tested was Composition D according to Table 5. As shown in FIG. 12, the addition of a cationic surfactant enhanced the stain rating at both 135° F. and 150° F.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. Any reference to accompanying drawings which form a part hereof, are shown, by way of illustration only. It is understood that other embodiments may be utilized and structural changes may be made without departing from the scope of the present disclosure. All publications discussed and/or referenced herein are incorporated herein in their entirety.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A laundry detergent composition comprising:

a cationic amine surfactant selected from the group consisting of: N-(3-aminopropyl)-Ndodecylpropane-1,3-diamine, N, N-Bis (3-aminopropyl) dodecylamine, NI,NI,N3-tris(3-aminopropyl)-N3-dodecyl propane-1, 3-diamine, N1,N1-bis(3-aminopropyl)-N3-dodecyl propane-1, 3-diamine, N 1-(3-aminopropyl)-N3-dodecyl propane-1,3-diamine, N-dodecyl propane-1,3-diamine, N,N-bis(3-aminopropyl)-octylamine, N,N-bis (3-aminopropyl)-dodecylamine, 4-aminomethyl-1,8-octanediamine, 1,3,5-tris-(aminomethyl)-benzene, 1,3, 5-tris-(aminomethyl)cyclohexane, tris-(2-aminoethyl)-amine, tris-(2-aminopropyl)-amine, tris-(3 aminopropyl)amine, N-(3-aminopropyl)-N-dodecyl propan-1,3-diamine, coco alkylbis(hydroxyethyl) methyl, ethoxylated, ammonium chloride, and combinations thereof;

from about 70 wt. % to about 90 wt. % of at least one nonionic surfactant; and water and/or a carrier suitable for a solid composition;

wherein a pH of the laundry detergent in a use composition is between about 7.5 to about 9.

2. The composition of claim 1, wherein the cationic amine surfactant is a multi-branched cationic amine, an ethoxylated amine, polyamine, or a quaternary ammonium compound.

3. The composition of claim 1, wherein the cationic amine is N-(3-aminopropyl)-N-dodecylpropan-1,3-diamine or a coco alkylbis(hydroxyethyl)methyl, ethoxylated, ammonium chloride.

4. The composition of claim 1, wherein the cationic amine surfactant comprises between about 0.5 wt. % to about 20 wt. % of the composition, and the water or carrier comprises between about 0.1 wt. % to about 50 wt. % of the composition.

5. The composition of claim 1, wherein the nonionic surfactants are a fatty alcohol alkoxylate, alcohol alkoxylate, EO/PO block copolymers, ethoxylated castor oil, alkyl polyglucosides, or combinations thereof.

6. The composition of claim 1, further comprising between about 0.1 wt. % to about 20 wt. % of at least one additional functional ingredient selected from the group consisting of optical brighteners, soil release polymers, solubility modifiers, dispersants, stabilizing agents, water conditioning agents, enzymes, builders, sequestrants, chelating agents, rheology modifiers, solubility modifiers, hydrotropes, couplers, alkalinity sources, and solvents.

7. The composition of claim 1, wherein the cationic amine surfactant comprises from about 1% to about 15% on an actives basis of the total surfactant concentration of the composition.

8. A method of washing textiles comprising:

contacting textiles with the laundry detergent composition according to claim 1 and an alkalinity source comprising a source of alkalinity or an alkaline detergent composition; and washing the textiles in an institutional or a household washing machine to remove soils.

9. The method of claim 8, wherein the contacting textiles comprises a 2-step cleaning wash process comprising first contacting the textiles with the laundry detergent composition at a pH between about 7.5 to about 9 during a wash cycle, and thereafter contacting the textiles with the alkali step to increase the pH above the pKa of the cationic amine surfactant.

10. The method of claim 9, wherein the contacting of the textiles with the alkali step increases the pH above 9.

11. The method of claim 9, wherein a second application of the laundry detergent composition at a pH between about 6 to about 9 during a wash cycle follows the alkali step.

12. The method of claim 8, further comprising diluting the laundry detergent composition at a point of use with water to form an aqueous use solution of the composition.

13. The method of claim 8, wherein the textile comprises at least one of polyester, cotton or polycotton blends.

14. The method of claim 8, wherein the wash cycle has a wash temperature about ≤150° F.

15. The method of claim 8, wherein the wash cycle provides about ≤500 ppm alkalinity for a low alkalinity laundry program.

16. The method of claim 8, wherein the wash cycle further comprises a bleaching step, antichlor step, souring step, a rinsing phase and/or a draining phase.

17. The method of claim 8, wherein the removal of soils is a reduction in visible residual oils on the textile, enhanced whiteness of the textile and/or reduction of soils with hygienically clean confirmation.

* * * * *